United States Patent
Ali Shah et al.

(10) Patent No.: US 9,755,864 B1
(45) Date of Patent: Sep. 5, 2017

(54) FRACTIONALLY SPACED ADAPTIVE EQUALIZER WITH NON-INTEGER SAMPLING

(71) Applicants: Syed Faisal Ali Shah, Kanata (CA); Chuandong Li, Ottawa (CA); Zhuhong Zhang, Ottawa (CA)

(72) Inventors: Syed Faisal Ali Shah, Kanata (CA); Chuandong Li, Ottawa (CA); Zhuhong Zhang, Ottawa (CA)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 15/228,592

(22) Filed: Aug. 4, 2016

Related U.S. Application Data

(60) Provisional application No. 62/304,682, filed on Mar. 7, 2016.

(51) Int. Cl.
*H04L 25/03* (2006.01)

(52) U.S. Cl.
CPC .. *H04L 25/03949* (2013.01); *H04L 25/03885* (2013.01)

(58) Field of Classification Search
CPC ......... H04L 25/03006; H04L 25/03019; H04L 25/03025; H04L 25/03044; H04L 25/03057; H04L 25/03063; H04L 25/03076; H04L 25/03121; H04L 25/03146; H04L 25/03885; H04L 25/03949
USPC .......... 375/229, 232–234, 350; 708/322, 323
See application file for complete search history.

(56) References Cited

U.S. PATENT DOCUMENTS

| | | | |
|---|---|---|---|
| 5,388,080 A | * | 2/1995 | Feintuch .............. G10K 11/178 367/135 |
| 5,495,203 A | | 2/1996 | Harp et al. |
| 7,248,630 B2 | | 7/2007 | Modrie et al. |
| 8,792,789 B1 | | 7/2014 | Varadarajan et al. |

(Continued)

FOREIGN PATENT DOCUMENTS

| | | |
|---|---|---|
| CN | 101425851 A | 5/2009 |
| WO | 2011064619 A1 | 6/2011 |

OTHER PUBLICATIONS

Ip, Ezra, et al., "Digital Equalization of Chromatic Dispersion and Polarization Mode Dispersion," Journal of Lightwave Technology, vol. 25, No. 8, pp. 2033-2043, 2007.

(Continued)

*Primary Examiner* — Young T Tse
(74) *Attorney, Agent, or Firm* — Gowling WLG (Canada) LLP

(57) ABSTRACT

An apparatus for performing fractionally spaced adaptive equalization with non-integer sub-symbol sampling has an adaptive equalizer that receives a continuous stream of input data having a non-integer, fractional delay between consecutive samples at a non-integer, sub-symbol rate and outputs a stream of equalized data based on tap weights of taps of the adaptive equalizer that are spaced at an interval corresponding to the non-integer, sub-symbol rate. The tap weights are updated independently of the fractional delay between consecutive samples of the input data using an error signal. An equalizer output alignment component downstream of the adaptive equalizer aligns the stream of equalized data with a corresponding transmitted symbol.

19 Claims, 17 Drawing Sheets

(56) References Cited

U.S. PATENT DOCUMENTS

| | | |
|---|---|---|
| 9,112,742 B2 | 8/2015 | Ali Shah et al. |
| 2007/0091996 A1* | 4/2007 | Yu ................... H04L 25/03038 375/233 |
| 2011/0051583 A1 | 3/2011 | Imai |
| 2014/0341267 A1* | 11/2014 | Ali Shah ........... H04L 25/03044 375/232 |

OTHER PUBLICATIONS

Laakso, Timo I., et al., "Splitting the Unit Delay: Tools for fractional delay filter design," IEEE Signal Processing Magazine, vol. 13, No. 1, pp. 30-60, 1996.
Oetken, Geerd, "A New Approach for the Design of Digital Interpolating Filters", IEEE Transactions Acoustics, Speech, and Signal Processing, vol. 27, No. 6, pp. 637-643, 1979.
Mou, Zhi-Jian, et al., "Short-Length FIR Filters and Their Use in Fast Nonrecursive Filtering," IEEE Transactions on Signal Processing, vol. 39, No. 6, pp. 1322-1332, 1991.
International Search Report of PCT/CN2016/110463 dated Feb. 27, 2017.

\* cited by examiner

| Sampling Instant | ←——————— Adaptive Filter Input Data Vector ———————→ | | | | | | | | |
|---|---|---|---|---|---|---|---|---|---|
| $n$ | $x(n)$ | $x(n-1)$ | $x(n-2)$ | $x(n-3)$ | $x(n-4)$ | $x(n-5)$ | $x(n-6)$ | $x(n-7)$ | $x(n-8)$ |
| $n+1$ | $x(n+1)$ | $x(n)$ | $x(n-1)$ | $x(n-2)$ | $x(n-3)$ | $x(n-4)$ | $x(n-5)$ | $x(n-6)$ | $x(n-7)$ |
| $n+2$ | $x(n+2)$ | $x(n+1)$ | $x(n)$ | $x(n-1)$ | $x(n-2)$ | $x(n-3)$ | $x(n-4)$ | $x(n-5)$ | $x(n-6)$ |
| $n+3$ | $x(n+3)$ | $x(n+2)$ | $x(n+1)$ | $x(n)$ | $x(n-1)$ | $x(n-2)$ | $x(n-3)$ | $x(n-4)$ | $x(n-5)$ |
| $n+4$ | $x(n+4)$ | $x(n+3)$ | $x(n+2)$ | $x(n+1)$ | $x(n)$ | $x(n-1)$ | $x(n-2)$ | $x(n-3)$ | $x(n-4)$ |

*FIG. 2*
*(Prior Art)*

| Sampling Instant | FDF Output Stream | Adaptive Filter Input Data Vector | | | | | | | | |
|---|---|---|---|---|---|---|---|---|---|---|
| $n$ | 1 | $x(n)$ | $x(n-1)$ | $x(n-2)$ | $x(n-3)$ | $x(n-4)$ | $x(n-5)$ | $x(n-6)$ | $x(n-7)$ | $x(n-8)$ |
| $n-1$ | 2 | $x'(n+1)$ | $x'(n)$ | $x'(n-1)$ | $x'(n-2)$ | $x'(n-3)$ | $x'(n-4)$ | $x'(n-5)$ | $x'(n-6)$ | $x'(n-7)$ |
| $n-2$ | 3 | $x''(n+2)$ | $x''(n+1)$ | $x''(n)$ | $x''(n-1)$ | $x''(n-2)$ | $x''(n-3)$ | $x''(n-4)$ | $x''(n-5)$ | $x''(n-6)$ |
| $n-3$ | 4 | $x'''(n+3)$ | $x'''(n+2)$ | $x'''(n+1)$ | $x'''(n)$ | $x'''(n-1)$ | $x'''(n-2)$ | $x'''(n-3)$ | $x'''(n-4)$ | $x'''(n-5)$ |
| $n-4$ | 1 | $x(n+4)$ | $x(n+3)$ | $x(n+2)$ | $x(n+1)$ | $x(n)$ | $x(n-1)$ | $x(n-2)$ | $x(n-3)$ | $x(n-4)$ |

*FIG. 3*
*(Prior Art)*

FRACTIONALLY SPACED ADAPTIVE EQUALIZER WITH NON-INTEGER SAMPLING

CROSS-REFERENCE TO RELATED APPLICATION

This application claims the benefit of U.S. Provisional Application No. 62/304,682, filed Mar. 7, 2016.

TECHNICAL FIELD

The present disclosure relates generally to optical communication systems and, more particularly, to fractionally spaced equalizers.

BACKGROUND

Typically, coherent optical receivers may utilize oversampling (e.g. the signal sampling rates are higher than an optical system's symbol rate) to enable fractionally spaced equalization of chromatic dispersion (CD) and/or polarization mode dispersion (PMD). In contrast to T-spaced (baud-spaced) equalizers, fractionally spaced equalizers (FSE) increase the tolerance against sampling phase errors and minimize noise enhancement arising from spectral nulls during aliasing and from spectrum folding at the equalizer input. Specifically, an FSE may reduce noise by sampling the received signal at a rate higher than the symbol rate to limit the amount of aliasing in the received signal. In addition, an adaptive FSE may correct for sampling phase error by interpolating and thereby reducing the effect of sampling phase error on noise. Unfortunately, current FSEs (e.g. T/2 spaced FSEs) may be relatively more complex, consume more power, and/or are more costly to implement within high baud rate optical communication systems.

U.S. Pat. No. 9,112,742 (Ali Shah et al), which is incorporated herein by reference in its entirety, discloses an apparatus having a processor coupled to a memory for executing instructions to cause the apparatus to receive an incoming signal at a sampling rate that is greater than a symbol rate of the incoming signal, replicate a plurality of data streams from the incoming signal, apply a plurality of fractional delays for the data streams, and perform an adaptive equalization on a plurality of data blocks generated from the data streams. FIG. 1 depicts an apparatus 10, according to the teachings of U.S. Pat. No. 9,112,742, which includes a fractional delay filter (FDF) 20, an adaptive filter 30 downstream of the FDF, a symbol detector 40 downstream of the adaptive filter 30 and a filter coefficient update component 50 which receives an error signal from the symbol detector 40. The filter coefficient update component 50 updates the filter coefficients of the adaptive filter 30.

The adaptive filter 30 does not operate as a conventional linear filter because of the preceding FDF 20. In other words, the input data to the adaptive filter 30 is not continuous. For example, two consecutive input vectors to the adaptive filter 30 do not represent an integer sample shift. FIG. 2 presents an example of adaptive filter input data vector without an FDF in which the adaptive filter behaves as a conventional linear filter. This is due to the fact that the input data vector at consecutive sampling instants, for example at sampling instant 'n' and 'n+1', has one complete sample shift as shown in FIG. 2. In comparison, FIG. 3 presents input with the FDF in which the data continuity is affected because of the FDF. The data discontinuity makes it difficult to implement low-complexity architectures for the adaptive filter 30 that are known to reduce the complexity of the filtering operation.

It would thus desirable to provide an improved adaptive fractionally spaced equalizer with non-integer sampling that enables a low-complexity architecture to be implemented for the adaptive filter.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

In general, the present specification discloses a low-complexity, adaptive fractionally spaced equalizer (AFSE) with non-integer, sub-symbol sampling. Disclosed herein is an apparatus that functions as a low-complexity adaptive fractionally spaced equalizer where sample spacing is a non-integer (rational) multiple (M/N) of the symbol interval T. The apparatus disclosed herein includes an adaptive equalizer (filter), a block formation component and a fractional delay filter (FDF) component. To achieve low complexity, the apparatus employs a single adaptive filter operating at a sampling rate N/(MT) to equalize impairments from the communication channel. The equalizer tap spacing is a fraction (M/N) of the symbol interval T to provide robustness against sampling phase errors. Due to non-integer sampling, the inter-symbol interference (ISI) introduced by the communication channel in the received signal varies cyclically from one group of received samples to the next group. To overcome this difficulty, the adaptive equalizer is followed by the FDF component that introduces fractional delays to align each group of equalized samples with respect to a corresponding transmitted symbol. The block formation component performs serial-to-parallel (S/P) conversion on the equalizer output and provides blocks of input data to the FDF component. The FDF component operates in a block mode and sequentially processes each of the M input data blocks at symbol rate 1/T. The sample spacing within each block of input data to the equalizer remains fractional at MT/N. In addition, the input data to the adaptive filter is continuous, enabling low-complexity linear filtering to be used and thereby reducing the power consumption, area and/or cost of the receiver. The equalizer tap weights are also adapted at rate 1/T using any appropriate method of tap weight updating, e.g., least mean square (LMS), zero forcing or recursive least squares (RLS).

In accordance with the present disclosure there is provided an apparatus for performing fractionally spaced adaptive equalization based on non-integer sub-symbol sampling, the apparatus comprising: an adaptive equalizer configured to receive a continuous stream of input data having a non-integer, fractional delay between consecutive samples at a non-integer, sub-symbol rate and to output a stream of equalized data based on tap weights of the adaptive equalizer, wherein the adaptive equalizer comprises a plurality of taps and a tap weight update component for updating the tap weights using an error signal; and an equalizer output alignment component disposed downstream of the adaptive equalizer and comprising a fractional delay filter (FDF) for aligning the stream of equalized data with a corresponding transmitted symbol, wherein the taps are spaced at an interval corresponding to the non-integer, sub-symbol rate, wherein the tap weights are updated independently of the fractional delay between consecutive samples of the input data.

In an embodiment of the apparatus, the equalizer output alignment component further comprises a serial-to-parallel (S/P) converter, wherein the S/P converter is configured to receive the stream of equalized data from the adaptive equalizer and to form a stream of block equalized data comprising a plurality of overlapping blocks.

In a further embodiment of the apparatus, the FDF is configured to receive the stream of block equalized data and to introduce a periodic fractional delay in the stream of block equalized data to time-align each block of equalized data with a corresponding transmitted symbol.

In a further embodiment of the apparatus, the FDF processes each block of equalized data at a symbol rate and introduces the fractional delay by computing an inner product of the block equalized data with FDF coefficients.

In a further embodiment, the apparatus further comprises a symbol detector downstream of the equalizer output alignment component, wherein the symbol detector is configured to detect transmitted symbols using the time-aligned equalized data blocks from the equalizer output alignment component and to provide an error signal at the symbol rate.

In a further embodiment, the apparatus further comprises an error alignment component configured to receive the error signal at the symbol rate from the symbol detector, wherein the error alignment component comprises an FDF to introduce a periodic fractional delay in the error signal to align the error signal with the continuous stream of input data at the sub-symbol rate.

In a further embodiment of the apparatus, the tap weight update component updates one or more tap weights of the adaptive equalizer, and wherein the adaptive equalizer tap weights are updated at the symbol rate using the error signal from the error alignment component and the continuous stream of input data.

In a further embodiment, the apparatus further comprises an equalizer input alignment component configured to receive the continuous stream of input data at the sub-symbol rate, and wherein the equalizer input alignment component comprises a plurality of FDFs to introduce a plurality of fractional delays in the input data in order to align the input data with the error signal at the symbol rate.

In a further embodiment of the apparatus, the tap weight update component updates one or more tap weights of the adaptive equalizer, and wherein the adaptive equalizer tap weights are updated at the symbol rate using the error signal from the symbol detector and the input data from the equalizer input alignment component.

In a further embodiment of the apparatus, the adaptive equalizer, receiving the continuous stream of input data, is configured to perform short convolutions between the input data and the tap weights to reduce complexity.

In accordance with the present disclosure there is further provided a method of performing fractionally spaced adaptive equalization with non-integer, sub-symbol sampling, the method comprising: receiving a continuous stream of input data having a non-integer, fractional delay between consecutive samples at a non-integer, sub-symbol rate; performing an adaptive equalization of the continuous stream of input data to generate a stream of equalized data at the sub-symbol rate; and aligning the stream of equalized data with a corresponding transmitted symbol by introducing a fractional delay in the equalized data, wherein the adaptive equalization of the input data is decoupled from the fractional delay alignment of the input data, wherein the adaptive equalization is based on taps that are spaced at an interval corresponding to the non-integer, sub-symbol rate.

In a further embodiment, the method further comprises performing a serial-to-parallel (S/P) conversion of the stream of equalized data from the adaptive equalizer to form a stream of block equalized data comprising a plurality of overlapping blocks.

In a further embodiment, the method further comprises introducing a fractional delay in the stream of block equalized data to time-align equalized data samples with a corresponding transmitted symbol.

In a further embodiment, the method further comprises detecting the transmitted symbols using the time aligned equalized data and providing an error signal at the symbol rate.

In a further embodiment, the method further comprises introducing a fractional delay in the error signal at the symbol rate to provide an error signal at the sub-symbol rate, wherein the error signal at the sub-symbol rate is time-aligned with the sub-symbol rate equalizer input data.

In a further embodiment, the method further comprises updating, at the symbol rate, a single set of adaptive equalizer tap weights using the time-aligned error signal at the sub-symbol rate and an equalizer block input signal formed by a S/P conversion of the equalizer input signal.

In a further embodiment, the method further comprises introducing a fractional delay in the continuous stream of input data to provide a block input data at the sub-symbol rate, wherein the block input data is time-aligned with the error signal at the symbol rate.

In a further embodiment, the method further comprises updating a single set of adaptive equalizer tap weights using the error signal at the symbol rate and the time-aligned equalizer block input signal at the sub-symbol rate, wherein the tap weight update is at the symbol rate.

In a further embodiment of the method, the adaptive equalization of the continuous stream of input data comprises short convolutions between the equalizer input data and tap weights to reduce complexity.

BRIEF DESCRIPTION OF THE DRAWINGS

These and other features of the disclosure will become more apparent from the description in which reference is made to the following appended drawings.

FIG. 2 is a table presenting input without FDF in which the adaptive filter behaves as a conventional linear filter.

FIG. 3 is a table presenting input with FDF in which the data continuity is broken because of the FDF.

DETAILED DESCRIPTION OF EMBODIMENTS

Figure 1:
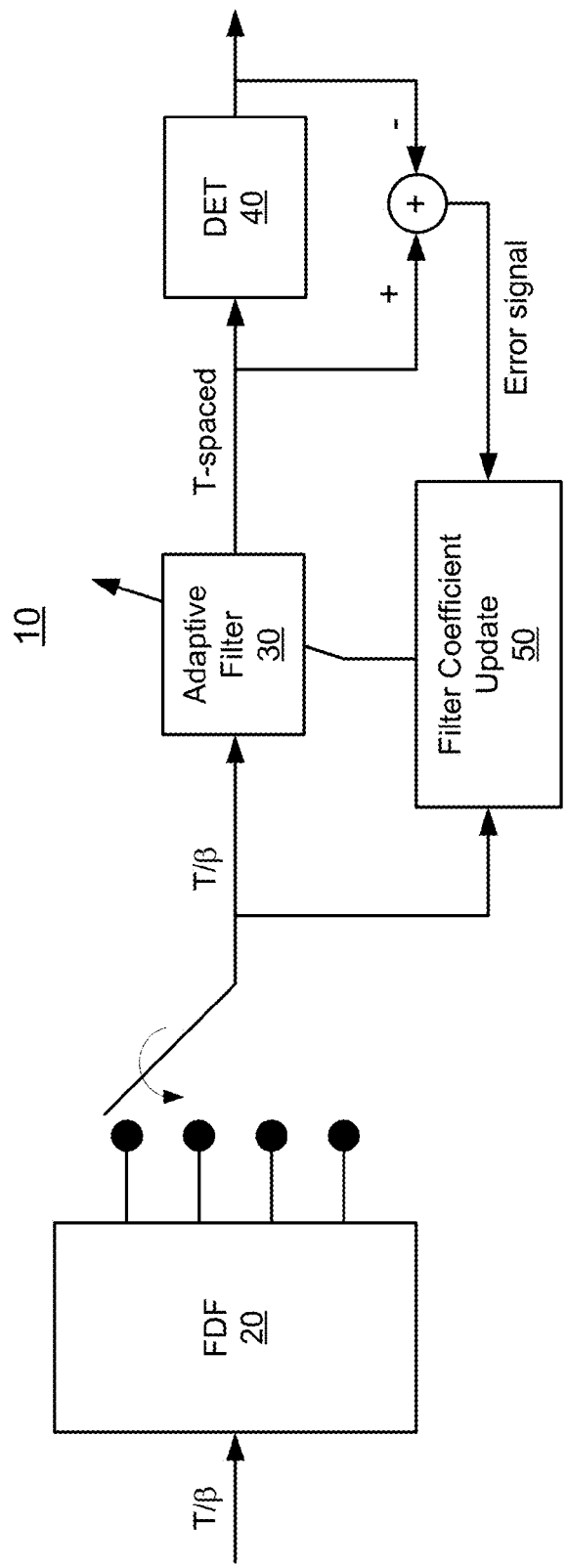
FIG. 1 is a schematic overview of a prior-art apparatus that provides adaptive fractionally spaced equalization with non-integer sampling.

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

In general, disclosed herein are methods, apparatuses and/or systems for low-complexity implementation of non-integer, sub-symbol sampling fractionally spaced adaptive equalization at a receiving node. To reduce complexity, the receiving node may decouple channel equalization functions from fractional delay for time alignment functions in a non-integer, sub-symbol sampling system. As described above, when a fractional delay filter is used at the input of the adaptive filter of the equalizer, it alters the data continuity, and thus prevents the use of some low-complexity architectures for the linear filter due to data discontinuity. The method and apparatus disclosed herein overcome this problem by feeding continuous data to the adaptive filter which is then followed by a fractional delay filter to adjust a fixed but periodic fractional delay between samples due to non-integer sampling. This enables the sampling rate of an analog-to-digital converter (ADC) to be lowered such that it can be used in a high baud rate optical communication receiver. The non-integer, sub-symbol sampling may be represented with the variable $\beta$, which may be expressed as a ratio of integers such that $\beta=N/M$, where N represents the number of samples of the received signal that correspond to M transmitted symbols. Equalizer tap spacing may be a fraction (M/N) of the symbol time interval T to provide robustness against sampling phase errors. The output for the AFSE may be at a symbol rate of 1/T, such that for each N input samples, the AFSE produces M outputs.

Embodiments of the disclosure may be used in a communication system which may be any communication system that includes, but is not limited to optical networks, wired networks, wireless networks, and/or satellite based communication networks. The communication system may include one or more local area networks (LANs), virtual networks, and/or wide area networks (WANs). For example, the communication system may be a data center network. Alternatively, the communication system may be an optical network, such as a Wavelength Division Multiplexing (WDM) network, a coherent dense WDM (DWDM) network, and/or a Synchronous Optical Network (SONET)/Synchronous Digital Hierarchy (SDH) network. The communication system may include a transmitting node, a communication channel, and a receiving node.

The transmitting node and the receiving node may communicate with each other over the communication channel. The communication channel may couple the transmitting node and the receiving node directly via one or more physical links, such as telephone lines, fiber optic cables, microwave transmission links (e.g. radio frequency (RF) transmission), and electrical links, or indirectly using one or more logical connections or physical links with intervening network nodes. Data signals transported in the communication channel may be sent in the electrical domain, optical domain, or both.

The transmitting node and the receiving node may be any network node configured to exchange data signals. The transmitting node and the receiving node may be network devices that are configured to operate in the electrical domain, the optical domain, or both. The transmitting node and the receiving node may be terminals, transceivers, transponders, regenerators, switches, routers, bridges, and/or any other network devices that are capable of processing optical and/or electrical data signals. In one embodiment, the transmitting node and the receiving node may be coherent optical devices. The transmitting node may transmit data signals via the communication channel to reach the receiving node. The receiving node may subsequently process and forward the data signal to one or more network nodes within the communication system and/or back to the transmitting node via the communication channel.

Furthermore, throughout the disclosure, the term "symbols" refers to an encoded message within a data signal. The term "symbol rate" and "baud rate" may be interchangeable throughout the disclosure and refer to the number of messages/symbols transmitted per second. Similarly, the terms "sub-symbol rate", "sub-symbol sampling rate," "sample rate," and "sampling rate" may be interchangeable throughout the disclosure and refer to the number of samples per second where each sample may be real or complex and may consist of one or more bits. Also, the term "signal" and "data'" may be interchangeable throughout the disclosure and refer to the discrete-time data samples of a sampled signal. The term "fractional delay" may be represented as the variable $\delta$, and refers to a delay that is equal to a fraction of the symbol time interval T (e.g. $0<\delta<1$). The term "tap weight", throughout the disclosure, refers to the coefficient, weight or gain or state of a filter tap.

In coherent digital communication systems, a fractionally spaced equalizer is employed to compensate for communication channel impairments in the presence of sampling phase errors. The design of adaptive fractionally spaced equalizer for integer based sub-symbol sampling (e.g., T/2 or T/3) systems is straightforward. However, for high-speed communication systems, sampling at twice the symbol rate or higher is not always feasible in terms of the A/D sampling rate and the speed of the subsequent signal processing circuitry. It is therefore desirable for high-speed communication systems to perform non-integer sub-symbol sampling such that the sampling rate $\beta/T$ is less than 2/T. In general, the scalar $\beta$ is selected as a ratio, $\beta=N/M$, such that $1<\beta<2$.

The apparatus (or system) and method disclosed herein are based on the concept of fractional delay (FD) between the received samples and the transmitted symbols when non-integer, sub-symbol sampling is employed. To elaborate, for an MT/N spaced equalizer, each group of N samples corresponds to M transmitted symbols. Assuming that nth received sample r(n) is time aligned with s(n), then in principle, a block of L samples $\underline{r}(n)=[r(n-L/2+1/2) \ldots r(n) \ldots r(n+L/2-1/2)]^T$ can be used to estimate s(n) with the help of a linear equalizer with tap weights $\underline{w}=[w(0) \ldots w(L-1)]^T$. The superscript T represents a transpose operation. However, the subsequent block of L samples composed of $\underline{r}(n+1)=[r(n-L/2+3/2) \ldots r(n+1) \ldots r(n+L/2+1/2)]^T$ is not time aligned with s(n+1) because there is a fractional delay of $\delta_1=1-\beta$ between s(n+1) and r(n+1). Thus, r(n+1) requires a linear equalizer with different tap weights $\underline{w}'$ to compensate for fractional delay as well as channel induced ISI. Since the fractional delay between s(n+1) and r(n+1) is known a priori, there is no need to jointly equalize the channel induced ISI and fractional delay through adaptive equalizer. Furthermore, the fractional delay between s(n+i) and r(n+i) is a function of i such that $\delta_i=(1-\beta)i$ for i=1 to M−1 and the joint equalization of fractional delay and ISI requires M different equalizers. To reduce the complexity, a single adaptive equalizer and M−1 fixed coefficient fractional delay filters (FDF) are used to align the equalizer output by introducing the required fractional delay $\delta_i$.

Figure 4:
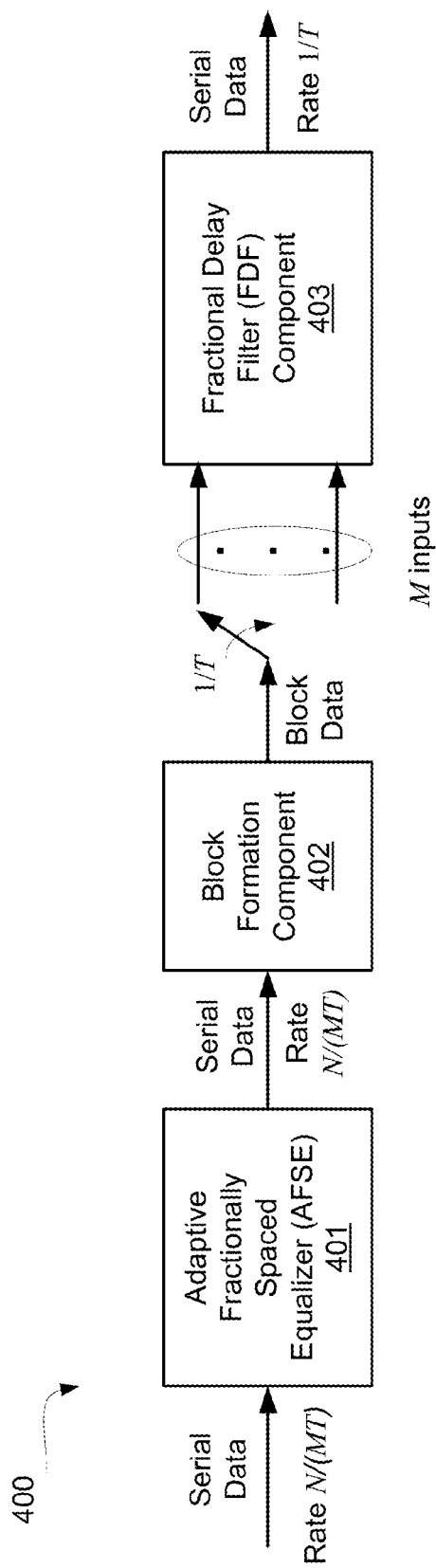
FIG. 4 is an overview of the data flow in an FDF-based AFSE system in accordance with embodiments of the disclosure.

FIG. 4 is a schematic diagram of an embodiment of an FDF based AFSE system 400 within a receiving node. For the purposes of this specification, the terms apparatus and system are used synonymously. The FDF based AFSE system 400 depicted in FIG. 4 may operate at relatively lower power and have a relatively smaller form factor when $\beta$ (non-integer, sub-symbol sampling) ranges from $1<\beta<2$. In particular, the relatively lower sub-symbol sampling rate may reduce the ADC sampling rate, which in turn reduces the power consumption of the FDF based AFSE system 400. Additionally, a relatively slower clock for subsequent digital signal processing may also reduce power consumption of the receiving node. Relatively lower power consumption and a relatively smaller form factor may be achieved by implementing embodiments of the FDF based AFSE system 400 which may utilize low-complexity methods to perform linear filtering within the AFSE 401. This low-complexity linear filtering operation is made possible because of the data continuity at the input of the AFSE 401. Further reduction in power consumption and form factor may also arise from implementing embodiments of the FDF based AFSE system 400 having a single AFSE 401 per output signal from an ADC. Including only a single AFSE 401 per output signal from an ADC reduces overall complexity due to the reduction of the number of adaptive equalizers within the FDF based AFSE system 400. Generally, as the number of equalizers increases, the design complexity also increases for an AFSE system. Capacity may also be increased because of the relatively lower power and the relatively smaller form factor.

In the embodiment depicted in FIG. 4, the FDF based AFSE system 400 receives an input serial data at a non-integer, sub-symbol sample rate of N/(MT). The input serial data may be a digital signal within the electrical domain and may comprise a plurality of input blocks. In one embodiment, an ADC (not shown in FIG. 4) may convert an analog signal received further upstream within the receiving node to output a converted digital signal. The variables N and M may represent integer numbers, where N refers to the number of input samples within an input block that corresponds to the M transmitted symbols that the FDF based AFSE system 400 outputs. For example, if the input signal sample rate is 5/(4T), then five input samples will correspond to four transmitted symbols. The variable T represents the symbol time interval (e.g. in microseconds or nanoseconds) for each of the M transmitted symbols. Typically, the value of variable N is greater than the value of variable M. In one embodiment, the serial sample rate of N/(MT) is determined by the maximum sampling rate of the ADC.

In the embodiment illustrated in FIG. 4, the FDF based AFSE system 400 may comprise an AFSE 401, a block formation component 402 and a FDF component 403 for non-integer, sub-symbol sampling. The FDF based AFSE system 400 decouples the channel-induced ISI equalization functions from the fractional delay functions for time alignment as described previously. To reduce or mitigate the ISI induced by channel impairments, a single AFSE 401 equalizes the received serial data to produce channel equalized samples at non-integer, sub-symbol rate N/(MT). The equalizer tap spacing may be a fraction (M/N) of the symbol interval T to provide robustness against sampling phase errors. The AFSE 401 may be a time domain equalizer or a frequency domain equalizer which may be configured as a FIR and/or IIR adaptive filter. The AFSE 401 may be configured for non-integer, sub-symbol sampling ratio $\beta$ that may have a ratio of the number of input samples in a group (e.g. represented by variable N) over the corresponding number of transmitted symbols (e.g. represented by variable M) in the group. Recall that the non-integer, sub-symbol sampling ratio $\beta$ may have a range from $1<\beta<2$. Other embodiments of the FDF based AFSE system 400 may be configured to have the non-integer, sub-symbol sampling ratio $\beta$ at values greater than about two.

In the embodiment illustrated in FIG. 4, the block formation component 402 is configured to perform serial-to-parallel (S/P) conversion on the output of the AFSE 401 and form blocks of equalized data with overlapping samples. To compensate for the ISI introduced by non-integer, sub-symbol sampling, the FDF component 403 may follow the AFSE 401 as shown in FIG. 4. The FDF component 403 may comprise a set of M−1 fixed-coefficient FDFs, and may sequentially process each of the incoming data blocks from the block formation component 402 at rate 1/T. To align the channel equalized samples with respect to the transmitted symbols, each of the fixed-coefficient filters may introduce a fixed fractional delay for the corresponding block of data from the block formation component 402. The FDF component 403 may generate fractional delays independently from the AFSE 401. The FDF component 403 may output the serial data at a symbol rate of 1/T, such that, for each of the N samples at the input of AFSE 401, the FDF component 403 produces M output symbols.

In one embodiment, to achieve low complexity, the FDF based AFSE system 400 comprises a single AFSE 401 for each ADC and/or each output signal from an ADC within a receiving node. In other words, a receiving node may have a 1:1 ratio between an AFSE 401 and an ADC and/or an ADC output signal. By decoupling the channel equalization functions from the fractional delay functions, a single AFSE 401 may be used to process the M streams, which are generated from a received digital signal from an ADC. Generally, as the number of equalizers increases, the design complexity of the FDF based AFSE system 400 increases. The use of a single AFSE 401 may also maintain the length of training symbols to be relatively low and/or unchanged because additional training symbols may be used to train each additional AFSE 401.

Figure 5:
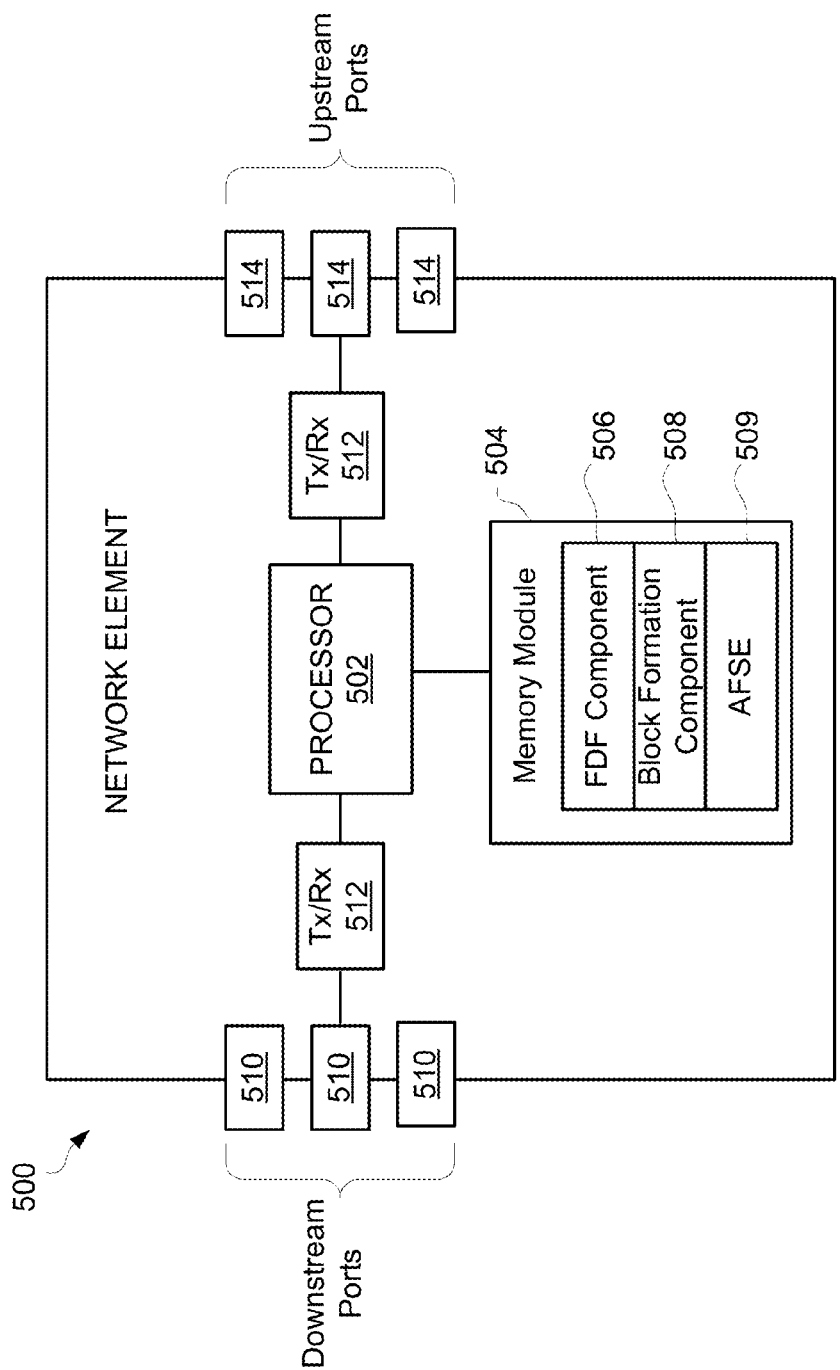
FIG. 5 is a block diagram depicting a network element incorporating the FDF-based AFSE system of FIG. 4.

At least some of the features/methods described in the disclosure may be implemented in a network element. For instance, the features/methods of the disclosure may be implemented using hardware, firmware, and/or software installed to run on hardware. FIG. 5 is a schematic diagram of an embodiment of a network element 500 that may be capable of performing fractionally-spaced adaptive equalization with non-integer, sub-symbol sampling within a receiving node. The network element 500 may be any apparatus and/or network node configured to receive a data signal and perform oversampling. For example, network element 500 may be a receiving node, such as a coherent optical receiver, a router, a switch, and/or any other network node configured to receive and process electrical and/or optical signals at the physical layer. The terms "network element", "network node", "network component", "network module", "network device" or similar terms may be interchangeably used to generally describe a network device and do not have a particular or special meaning unless otherwise specifically stated and/or claimed within the disclosure.

The network element 500 may comprise one or more downstream ports 510 coupled to a transceiver (Tx/Rx) 512, which may be transmitters, receivers, or combinations thereof. The Tx/Rx 512 may transmit and/or receive frames from other network nodes via the downstream ports 510. Similarly, the network element 500 may comprise another Tx/Rx 512 coupled to a plurality of upstream ports 514, wherein the Tx/Rx 512 may transmit and/or receive frames from other nodes via the upstream ports 514. The downstream ports 510 and/or upstream ports 514 may include electrical and/or optical transmitting and/or receiving components. In one embodiment, the Tx/Rx 512 may transmit and/or receive data (e.g., packets) from other network elements wirelessly via one or more antennas. For example, the antennas may be multiple-input-multiple-output (MIMO) antennas and may be configured to send and receive orthogonal frequency-division multiple access (OFDMA) signals or wireless fidelity (Wi-Fi) signals.

A processor 502 may be coupled to the Tx/Rx 512 and may be configured to process the frames and/or determine which nodes to send (e.g. transmit) the frames. In one embodiment, the processor 502 may comprise one or more multi-core processors and/or memory modules 504, which may function as data stores, buffers, etc. The processor 502 may be implemented as a general processor or may be implemented as one or more application specific integrated circuits (ASICs), field programmable gate arrays (FPGAs), and/or digital signal processors (DSPs). Although illustrated as a single processor, the processor 502 is not so limited and may comprise multiple processors. The processor 502 may be configured to implement any of the schemes described herein, including a method 1600 of FIG. 16 described further below.

FIG. 5 illustrates that the memory module 504 may be coupled to the processor 502 and may be a non-transitory computer-readable medium configured to store various types of data. Memory module 504 may comprise memory devices including secondary storage, read only memory (ROM), and random access memory (RAM). The secondary storage is typically comprised of one or more disk drives, solid-state drives (SSDs), and/or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 504 may be used to store the instructions or code for carrying out the system and methods described herein, e.g. method 1600. As shown in the embodiment of FIG. 5, the memory module 504 comprises an FDF component 506, a block formation component 508, and an adaptive fractionally spaced equalizer (AFSE) 509 that may be executed by the processor 502. Alternately, the FDF component 506, the block formation component 508, and the AFSE 509 may be implemented directly on the processor 502. The FDF component 506 may be configured to align the input samples with respect to the transmitted symbols by introducing a fractional delay. The block formation component 508 may be configured to perform S/P conversion and form data blocks from each of the M streams. The AFSE 509 may be configured to adaptively perform equalization to compensate for communication channel impairments. The FDF component 506 may be decoupled from the ASFE 509. Functions performed by the FDF component 506, the block formation component 508, and the AFSE 509 are further described below.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray™ disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires and optical fibers) or a wireless communication line.

It is understood that by programming and/or loading executable instructions onto the network element 500, at least one of the processor 502, the cache, and the long-term storage are changed, transforming the network element 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain.

Figure 6:
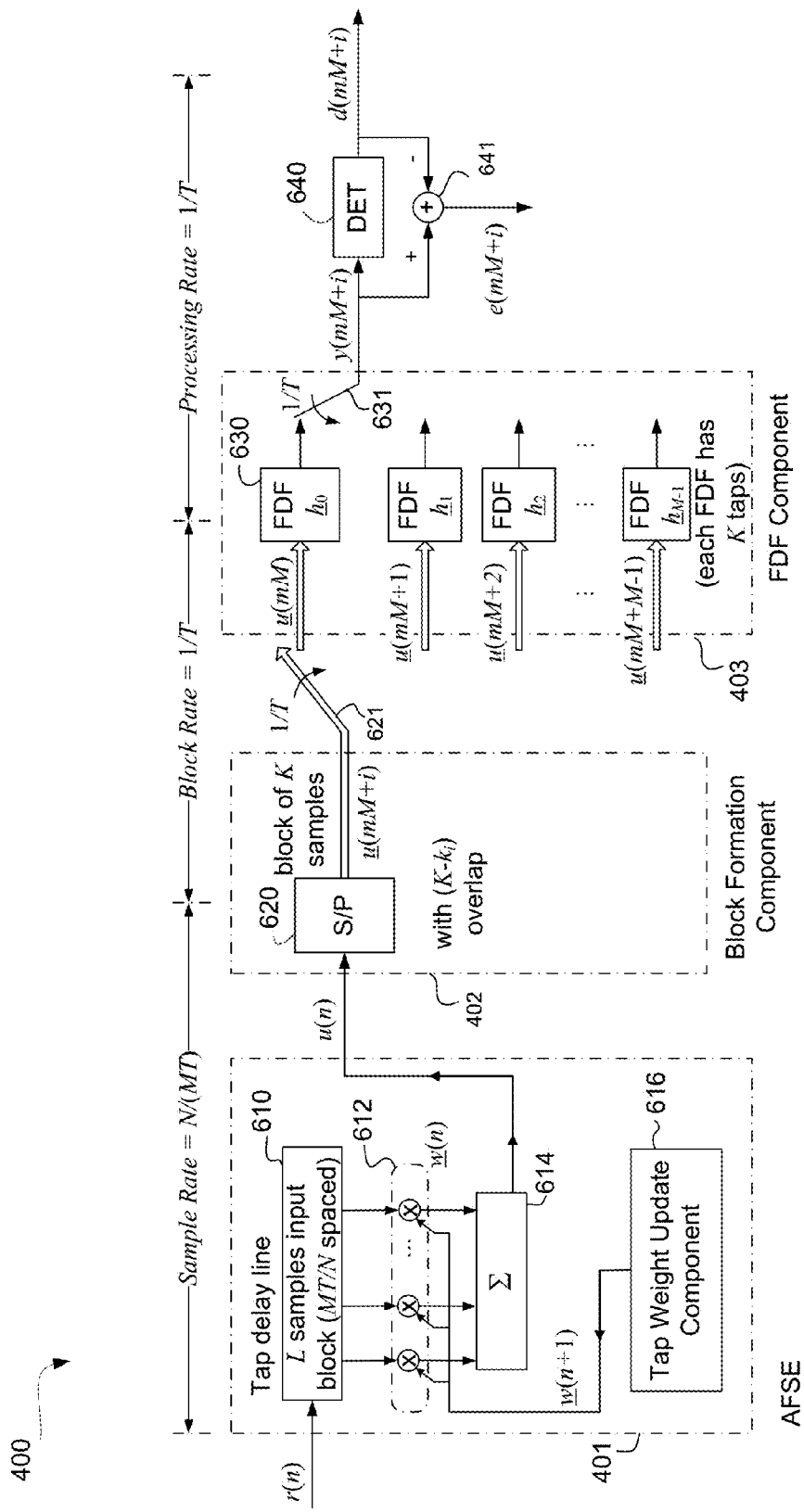
FIG. 6 is a block diagram of the FDF-based AFSE system showing further details.

FIG. 6 is a schematic diagram of another embodiment of an FDF based AFSE system 400 within a receiving node where the AFSE 401 is shown to be configured as a time domain, FIR adaptive filter. Note that the AFSE 401 may be configured as a time-domain or frequency-domain FIR or IIR adaptive filter. In the embodiment of FIG. 6, the AFSE 401 is shown to have L coefficients or filter tap weights. In other words, the variable L may represent the length of the AFSE 401 that may be dictated by the channel conditions and typically range from about 10 to 20. As illustrated in FIG. 6, the AFSE 401 may comprise an L sample input tap delay line 610, a filter tap weight component 612, an adder 614 and a tap weight update component 616. The L samples input tap delay line 610 may receive an input serial data, r(n), at a sample rate of N/(MT). The variable n refers to the time index of the received serial data, which may also correspond to the $n^{th}$ block of input data processed by the AFSE 401. The filter tap weight component 612 may comprise L different filter coefficients to equalize the input data received from the L samples input tap delay line 610. The L samples input tap delay line 610 may space out the samples such that the samples within the block data are MT/N spaced. If $\underline{w}(n)=[w_0(n), \ldots, w_{L-1}(n)]^T$ is a L×1 vector of the filter tap weights for the nth block of input data, then the AFSE output from the adder 614 is described in equation 1:

$$u(n)=\Sigma_{l=0}^{L-1} r(n-l)w_l(n) \quad (1)$$

The variable u(n) in equation 1 represents the channel equalized output data for the $n^{th}$ block of input data. As shown in FIG. 6, the filter tap weight component 612 comprises one or more sets of filter tap weights that may be updated by the tap weight update component 616 completely or partially, where a subset of L filter tap weights are updated during each weight update iteration. The tap weight update component 616 will be discussed in more detail with the help of FIG. 12 and FIG. 14.

Unlike the implementations disclosed in U.S. Pat. No. 9,112,742, the input to the AFSE 401 in FIG. 6 is a continuous stream of received samples. Since there is no data discontinuity in the input data, the system 400 may utilize simplified (low-complexity) linear filter designs for linear filtering by the AFSE 401. For example, the concept of short or iterated convolutions can be utilized to reduce the number of multiplications needed within the linear filtering operation of the AFSE 401. These simplifications will be described shortly.

In FIG. 6, the block formation component 402 may process the channel equalized serial data from the AFSE 401. The block formation component 402 may use a serial-to-parallel (S/P) converter 620 and forms a stream of block equalized data with overlapping samples. Each output block data from the block formation component 402 may have a length of K samples and may be expressed as a vector:

$$\underline{u}(mM+i)=[u(mN+\lfloor i\,N/M\rfloor),u(mN+\lfloor i\,N/M\rfloor-1),\ldots,u(mN+\lfloor i\,N/M\rfloor-K+1)]^T \quad (2)$$

where $\lfloor x \rfloor$ in equation 2 represents the largest integer that is less than or equal to x and the variable K represents the number of filter coefficients in the downstream FDF component 403. The S/P converter 620 may form blocks of equalized data with an overlap of $K-k_i$ samples from the previous block, where $k_i$ for the $(mM+i)^{th}$ block is calculated as:

$$k_i=\lfloor i\,N/M\rfloor-\lfloor(i-1)N/M\rfloor \text{ for } i=0,1,\ldots,M-1 \quad (3)$$

In other words, the variable $k_i$ in equation 3 may assume values from the set $\{1, 2, \ldots, \lfloor N/M\rfloor+1\}$ such that each N new samples at the input of AFSE 401 may lead to M blocks of overlapping data from the block formation component 402. The overlapping of MI-N samples over M blocks of data of length K may reduce the block rate to 1/T when the input sampling rate is N/(MT). Overlapping of the blocks will be discussed in more detail in FIG. 9.

In FIG. 6, the output of the block formation component 402 may be connected to the FDF component 403 through a demultiplexer or commutator 621 that may be configured to sequentially feed the block data from the block formation component 402 to one of the M inputs of the FDF component 403. The demultiplexer or commutator 621 may cycle through the M inputs of the FDF component 403 at symbol rate 1/T. In FIG. 6, the M different input data blocks during one complete cycle are illustrated as $\underline{u}(mM+i)$ for $1=0, 1, \ldots, M-1$ (e.g. $\underline{u}(mM)$ through $\underline{u}(mM+M-1)$). In one embodiment, the block formation component 402 along with the commutator 621 may achieve rate conversion from input sampling rate of N/MT to output block rate of 1/T without changing the sample spacing within a block of output data. Other methods known by persons of ordinary skill in the art may be used to achieve block rate conversion without altering the sample spacing within the block.

The FDF component 403 may comprise a set of FDFs 630. Each FDF 630 may be a finite impulse response (FIR) filter, infinite impulse response (IIR) filter, and/or any other suitable signal-processing module that is capable of introducing or otherwise providing fractional delay in a digital signal. There exists a wide range of methods for the design of FIR-based fractional delay filters. In one embodiment, the FDFs 630 may be FIR filters as described in T. I. Laakso, et al., "Splitting the unit delay: Tools for fractional delay filter design," IEEE Signal Processing Magazine, Vol. 13, No. 1, 1996 ("Laakso"), which is incorporated by reference in its entirety. In another embodiment, the FDF 630 may be a FIR filter configured to perform Lagrange polynomial interpolation which may be suitable if the bandwidth of the underlying signal is commensurate with the Lagrange polynomial interpolation filter frequency response. Other filters or systems known by persons of ordinary skill in the art may be used as the FDFs 630.

In one embodiment of the FDF based AFSE 400, the FDF component 403 includes a set of M branches as shown in FIG. 6. Each of the M branches may comprise a FDF 630 that may be configured to compute an inner product with the incoming data block to adjust the fractional delay of the corresponding channel equalized sample. The FDF 630 operates on a block of input data of length K to produce a single, delay adjusted, output sample that may correspond to the middle of the input data block. The output of the FDF 630 may be considered as a soft estimate of the transmitted symbol corresponding to the middle of the input data block. The FDF 630 in the first branch (i=0) is labeled as FDF $\underline{h}_0$ in FIG. 6 and may be configured to act as a trivial filter with only one non-zero tap coefficient such that it introduces an integer delay corresponding to the group delay (integer part)

of FDFs 630 in other branches. In general, the FDF 630 in the $i^{th}$ branch introduces a fractional delay of $\delta_i=(1-\beta)i$ for $i=1$ to $M-1$ with respect to the FDF $\underline{h}_0$ in the first branch. In FIG. 6, the FDF 630 in the second branch ($i=1$) is labeled as FDF $\underline{h}_1$ and introduces a delay of $\delta_1=1-\beta$. The FDF 630 in the third branch ($i=2$) is labeled as FDF $\underline{h}_2$ and introduces a delay of $\delta_2=2-2\beta$, and so forth until the $M^{th}$ branch and the FDF $\underline{h}_{M-1}$. The fractional delay $\delta_i$ may be a fixed rational number that differs for each of the FDF 630. Aligning the channel equalized input samples with corresponding transmitted symbols are discussed in more detail in FIG. 10 and FIG. 11.

The FDF 630 in each of the M branches of the FDF component 403 in FIG. 6 may process the input block data at rate $1/(MT)$ so that the combined processing rate of the FDF component 403 is $1/T$. In general, if $h_i(k)$ may represent the $k^{th}$ coefficient of the FDF 630 located in the $(i+1)^{th}$ branch that introduces a fractional delay of $\delta_i$ in the channel equalized samples, then the vector of filter coefficients of the FDF 630 can be written as $\underline{h}_i=[h_i(0) \ldots h_i(K-1)]^T$, where the superscript $^T$ denotes a vector transpose operation. Now the output of the FDF 630 in the $(i+1)^{th}$ branch can be described as an inner product between the block input data $\underline{u}(mM+i)$ and the filter coefficients $\underline{h}_i$. Mathematically, $$y(mM+i)=\underline{u}^T(mM+i)\underline{h}_i \text{ for } i=0,1,\ldots,M-1 \quad (4)$$

Recall that $\underline{u}(mM+i)$ in equation 4 may represent the $(mM+i)^t$ block of channel equalized output of length K from the block formation component 402 and the superscript $^T$ denotes a vector transpose operation. The variable $y(mM+i)$ in equation 4 may represent the soft output from the $(i+1)^{th}$ branch of the FDF component 403 for the $m^{th}$ block of input data from the block formation component 402. The FDF 630 may operate at a sample rate of $1/T$.

In the embodiment of FIG. 6, the output from each of the M branches with FDF 630 may be connected to a symbol demodulator or symbol detector (DET) 640 through a commutator 631 that may sequentially tap the output data sample from FDF 630 in each of the M branches. The commutator 631, in this embodiment, cycles through the M branches at symbol rate $1/T$. The demodulator 640 may be a slicer that acts as a hard-decision device and produces a corresponding output of $d(mM+i)$ based on the signal modulation method. The variable d belongs to a finite set of real and/or complex numbers determined by the signal modulation method. The output from the symbol detector 640 and the output from the FDF component 403 may be fed as an input into the comparator 641 to determine an error signal given by $e(mM+i)=y(mM+i)-d(mM+i)$, where the variable e represents an error signal. The error signal $e(mM+i)$ may be used to update the tap weights of the AFSE 401.

In another embodiment of the FDF component 403, a single FDF 630 may be used with periodically changing filter coefficients to compensate for the periodic fractional delays $\{\delta_0, \delta_1, \ldots, \delta_{M-1}\}$ in the channel equalized block output from the block formation component 402, wherein the fractional delay $\delta_i=(1-\beta)i$, for $i=0$ to $M-1$, corresponding to a non-integer fractional sampling ratio of $\beta$.

Figure 7:
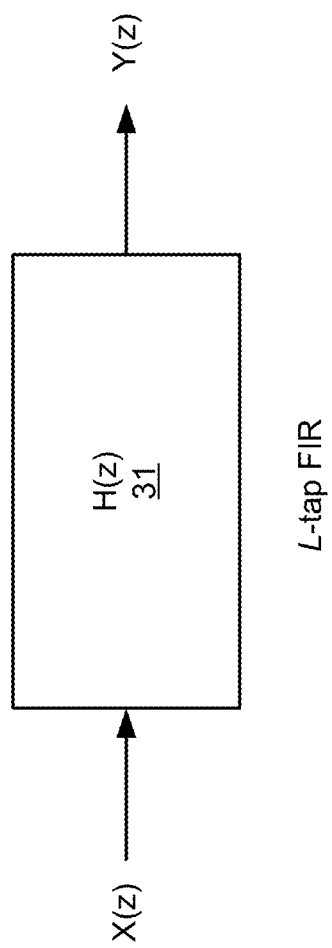
FIG. 7 depicts an example of a finite impulse response (FIR) filter with L filter coefficients that is implemented as a transversal tapped delay-line with L-taps.

FIG. 7 depicts a block diagram view of the input and output for a finite impulse response (FIR) filter having filter function H(z) 31 for transforming an input function X(z) into an output function Y(z). The filter function H(z) 31 may be implemented as a L-tap filter, and may perform $L^2$ complex multiplications for providing L complex outputs.

Figure 8:
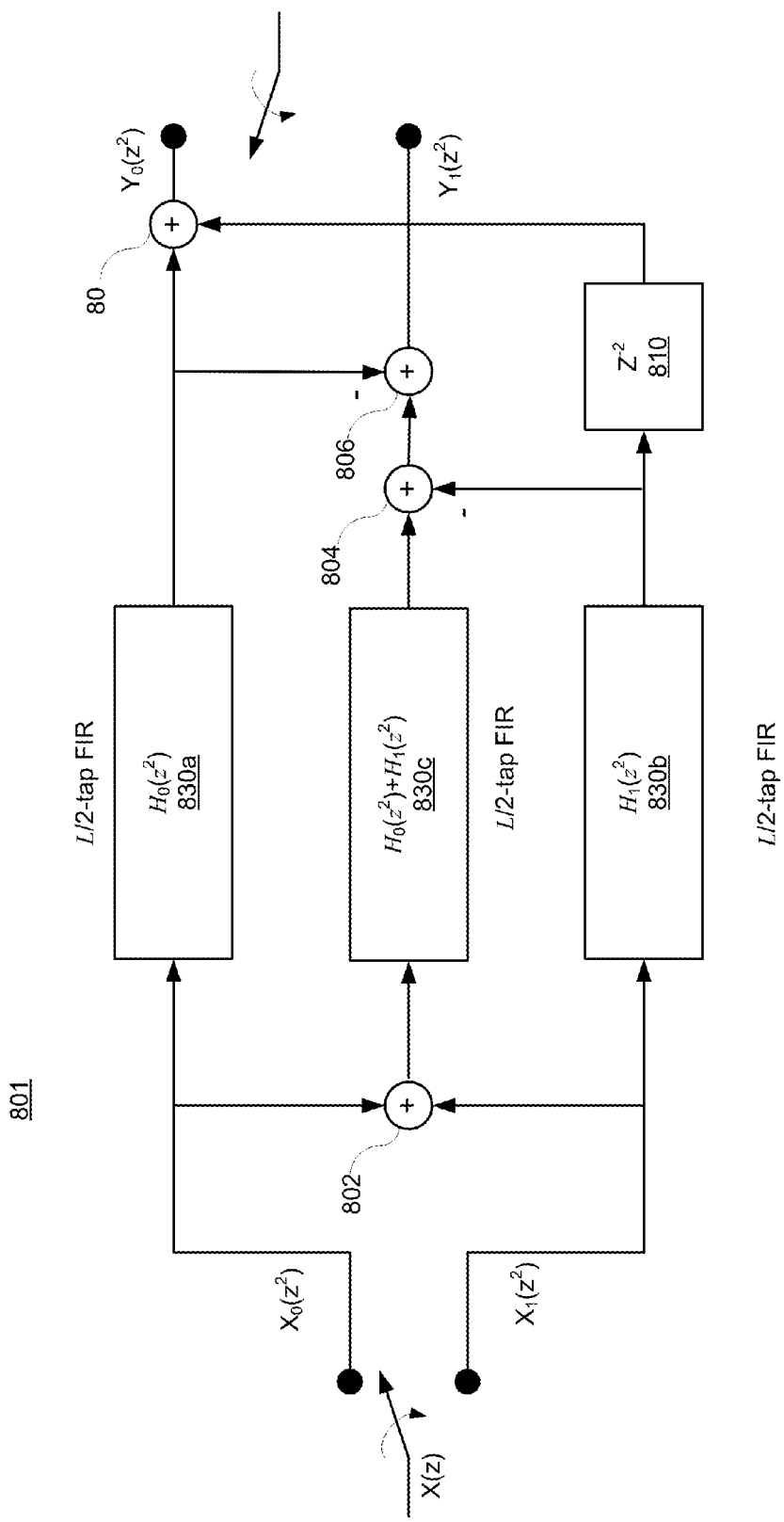
FIG. 8 depicts an example of a low-complexity architecture for the FIR filter using three short-length FIR filters.

FIG. 8 depicts an example of a low-complexity FIR filter architecture using short convolutions as disclosed in Z.-J. Mou and P. Duhamel, "Short-length FIR filters and their use in fast nonrecursive filtering," *IEEE Trans. Signal Process.*, vol. 39, no. 6, pp. 1322-1332, June 1991. The FIR architecture illustrated in FIG. 8 is mathematically equivalent to the one shown in FIG. 7. However, the FIR architecture of FIG. 8 exploits short-convolutions to implement an L-tap FIR using three short-length FIRs, namely $H_0(z^2)$, $H_1(z^2)$ and $H_0(z^2)+H_1(z^2)$, each with only $L/2$ taps. As a consequence, the FIR architecture of FIG. 8 requires only $L^2/4+L^2/4+L^2/4=3L^2/4$ complex multiplications to implement an L-tap FIR filter. The FIR architecture of FIG. 8 may reduce the complexity of the filtering operation of the AFSE 401.

Figure 9:
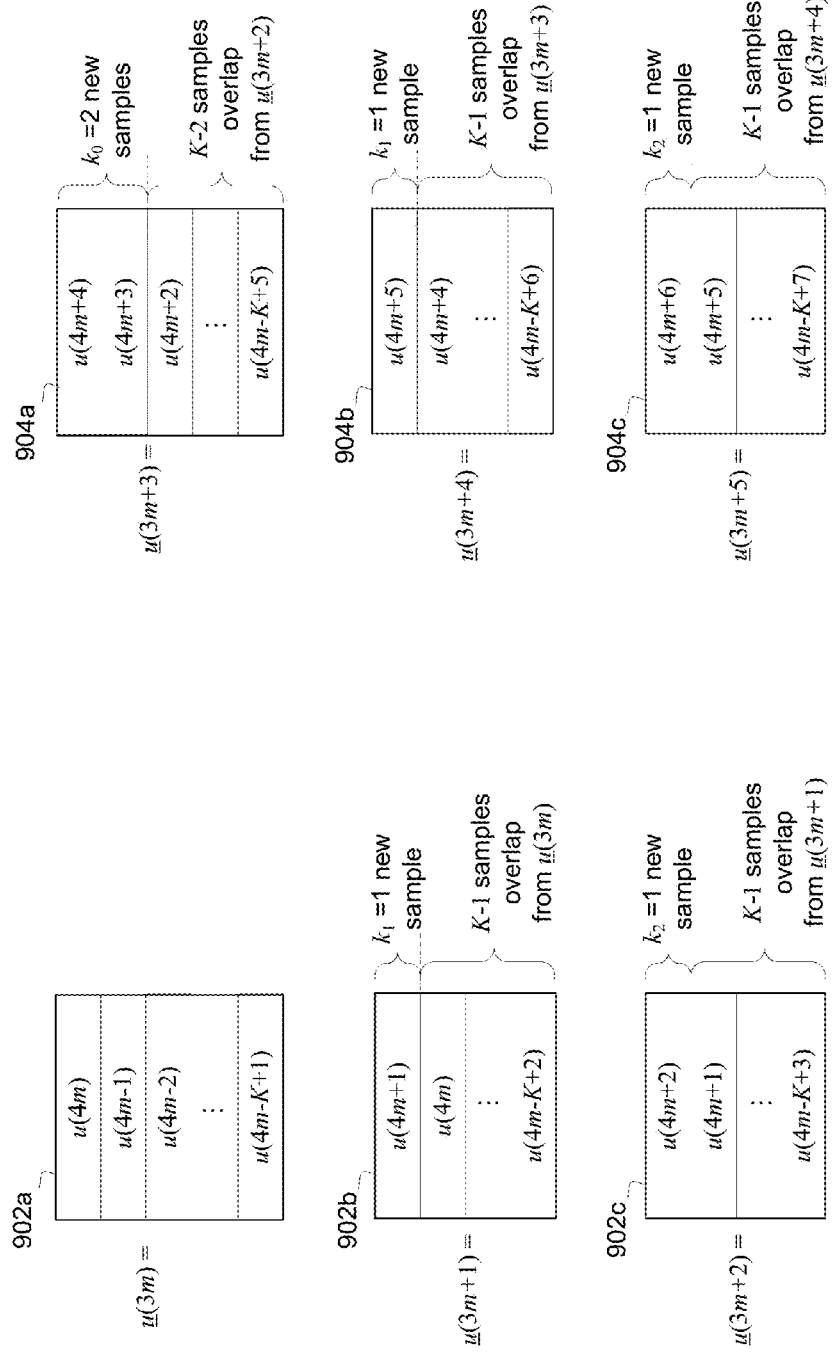
FIG. 9 is a signal diagram of an embodiment of the blocks of data formed by the block formation component.

FIG. 9 is a signal diagram of an embodiment of the blocks of data formed by the block formation component 402 shown in FIG. 4 and FIG. 6. FIG. 9 illustrates an example of output blocks of length K with overlapping samples that may correspond to non-integer, sub-symbol sampling with $M=3$ and $N=4$ or $\beta=4/3$. With this sampling ratio, the FDF component 403 in FIG. 6 may have three branches, i.e. $i=0,1,2$, and the block formation component 402 in FIG. 6 may generate block outputs $\underline{u}(3m+i)$ that may be processed by the $i^{th}$ branch of the FDF component 403. In FIG. 9, the output blocks 902a-902c from the block formation component 402 represent the block outputs $\underline{u}(3m)$, $\underline{u}(3m+1)$ and $\underline{u}(3m+2)$, respectively, with overlapping samples. The block output $\underline{u}(3m+1)$ 902b in FIG. 9 contains one new sample ($k_1=1$) relative to the previous block output $\underline{u}(3m)$. The rest of the K-1 samples in block output $\underline{u}(3m+1)$ 902a are from the previous block $\underline{u}(3m)$ 902b. Similarly, the block output $\underline{u}(3m+2)$ is formed by using one new sample ($k_2=1$) and K-1 samples from the previous block $\underline{u}(3m+1)$ 902b. However, the next block output $\underline{u}(3m+3)$ 904a is formed by using two new samples ($k_0=2$) and K-2 samples from the previous block $\underline{u}(3m+2)$ 902c. Thus, in total, four samples u(4m+1), u(4m+2), u(4m+3) and u(4m+4) at the input of block formation component 402 are used to generate three output blocks $\underline{u}(3m+1)$, $\underline{u}(3m+2)$ and $\underline{u}(3m+3)$ with overlapping samples as described above. This pattern of sample overlapping repeats after every $M=3$ output blocks for the example shown in FIG. 9.

Figure 10:
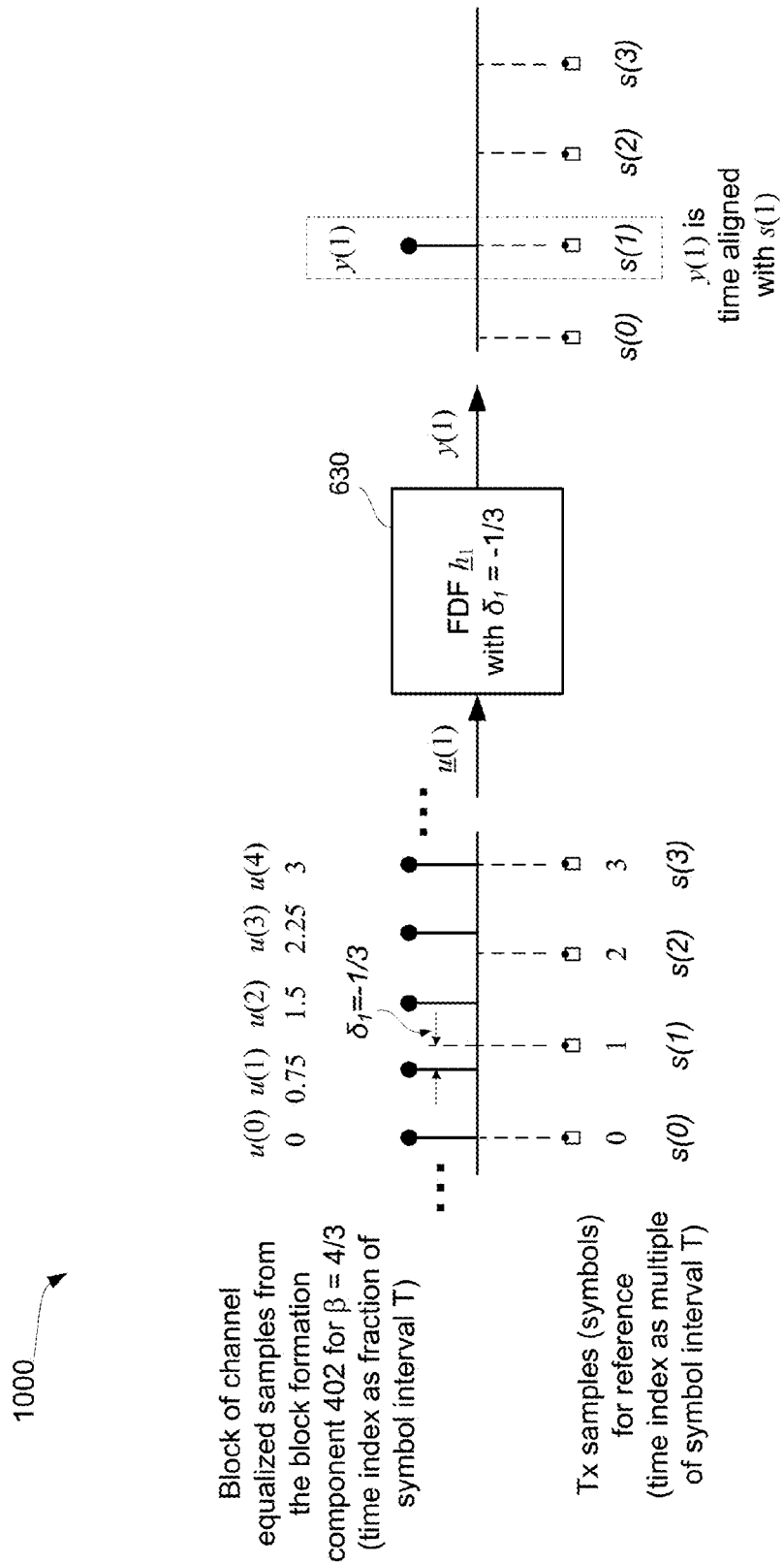
FIG. 10 depicts the operation of an embodiment of the FDF component used to align an output sample of the equalizer with a transmitted output symbol.

FIG. 10 is a signal diagram of an embodiment of the FDF component 1000 used to align a sample of the channel equalized data from the AFSE 401 with a transmitted output symbol. The FDF component 1000 may comprise a FDF 630, which corresponds to the FDF $\underline{h}_1$ shown in FIG. 6. The FDF $\underline{h}_1$ provides a fractional delay for the second branch ($i=1$). In FIG. 10, the block of input samples to FDF 630 may represent the channel equalized samples from the AFSE 401 that may be converted to blocks by the block formation component 402 in FIG. 6. The channel equalized samples may correspond to non-integer, sub-symbol sampling with ratio $\beta=4/3$ (e.g. from an ADC that precedes the AFSE 401). In other words, there may be four channel equalized samples, u(0), u(1), u(2) and u(3), for every three transmitted symbols, s(0), s(1) and s(2), where s(n) may represent the transmitted symbol at time nT. Without loss of generality, it may be assumed that u(0) is time-aligned with s(0). However, u(1) may not be time-aligned with s(1) and may represent an interpolated value at time $t=0.75T$ between s(0) and s(1). In order to time align u(1) with s(1), the input block of channel equalized samples $\underline{u}(1)$ need to be delayed by $\delta_1=(0.75-1)/(0.75)=-1/3$. To accomplish this, the FDF 630 may be designed using any of the methods as described earlier to introduce a delay of $\delta_1=-1/3$ such that the filter output y(1) is time-aligned with s(1).

Figure 11:
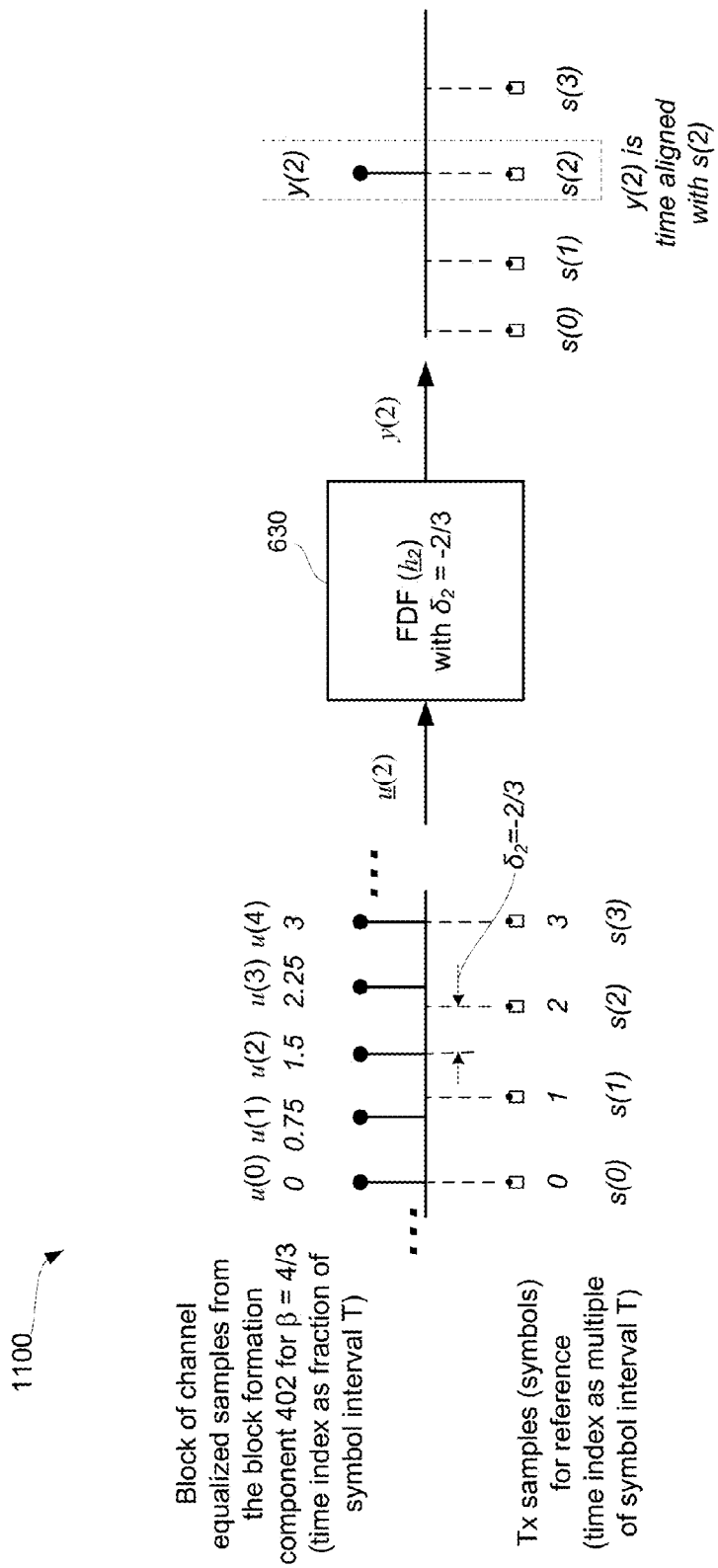
FIG. 11 depicts the operation of an embodiment of the FDF component used to align an output sample of the equalizer with a transmitted output symbol.

FIG. 11 is a signal diagram of another embodiment of the FDF component 1100 used to align a sample of the channel equalized data from the AFSE 401 with a transmitted output symbol. The FDF component 1100 may comprise an FDF 630, which corresponds to the FDF $\underline{h}_2$ shown in FIG. 6. The FDF $\underline{h}_2$ provides a fractional delay for the third branch (i=2). Similar to FIG. 10, the received input signal in FIG. 11 is up-sampled by a non-integer, sub-symbol sampling ratio β=4/3. As shown in FIG. 11, u(2) may represent an interpolated value at time t=1.5T between s(1) and s(2). To time align u(2) with s(2), the input block of channel equalized samples $\underline{u}$(2) may need to be delayed by $\delta_2$=(1.5−2)/(0.75)=−2/3. To accomplish this, the FDF 630 may be designed to introduce a delay of $\delta_2$=−2/3 such that the filter output y(2) may be aligned with s(2).

Figure 14:
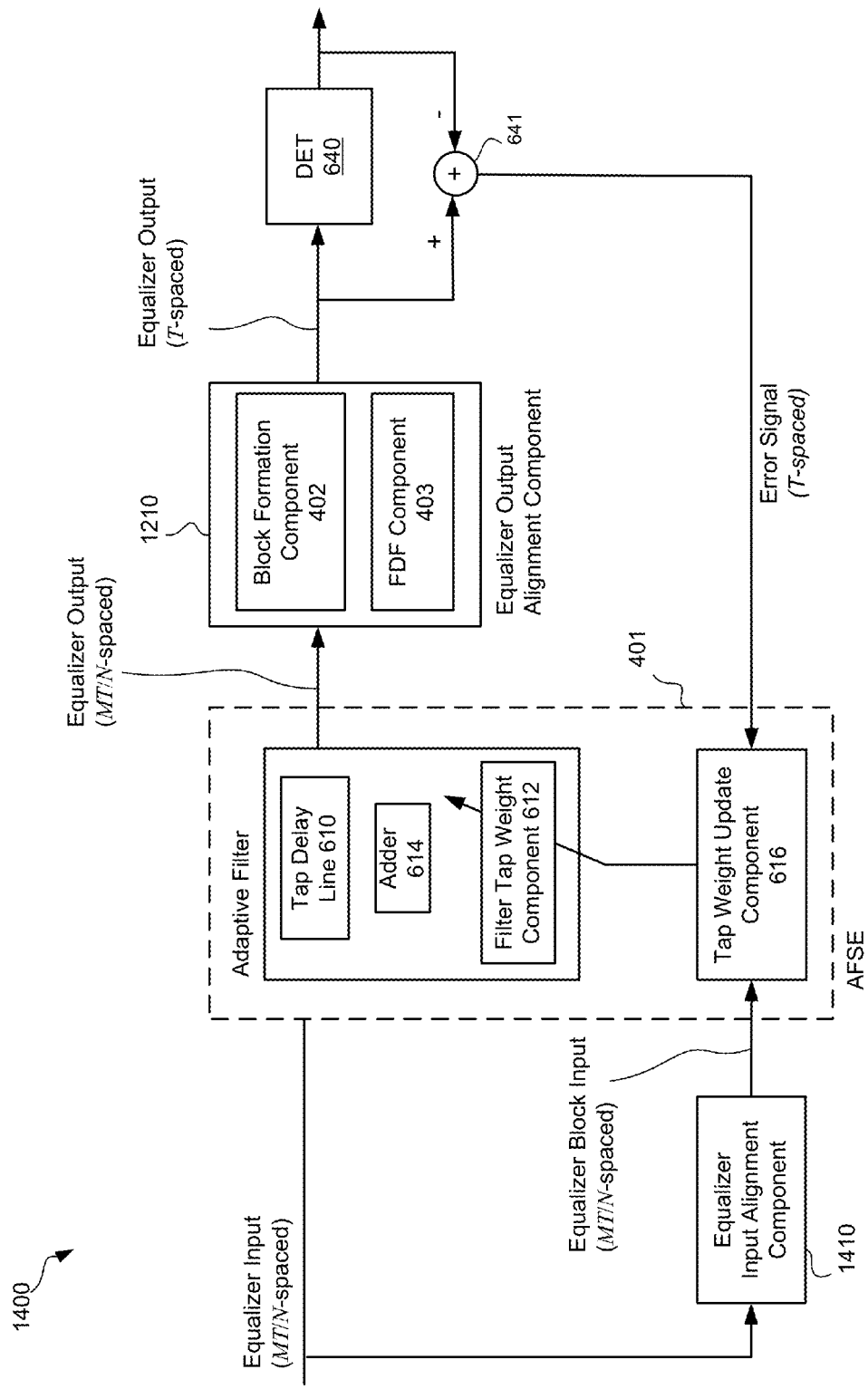
FIG. 14 depicts a more detailed implementation of the FDF-based AFSE system in accordance with another specific embodiment.

Since there is a non-integer fractional delay between two consecutive input vectors to the tap delay line 610 of the AFSE 401 shown in FIG. 6, the tap weight update component 616 of the AFSE 401 requires time alignment between the MT/N-spaced equalizer input signal and the T-spaced error signal. In particular, either a fractional delay is introduced in the T-spaced error signal in order to time align with the MT/N-spaced equalizer input signal or the MT/N-spaced equalizer input signal is passed through a fractional delay filter to time align with the T-spaced error signal. To achieve this, two separate embodiments of the FDF based AFSE 400 with error signal feedback to the tap weight update component 616 are illustrated in FIG. 12 and FIG. 14.

Figure 12:
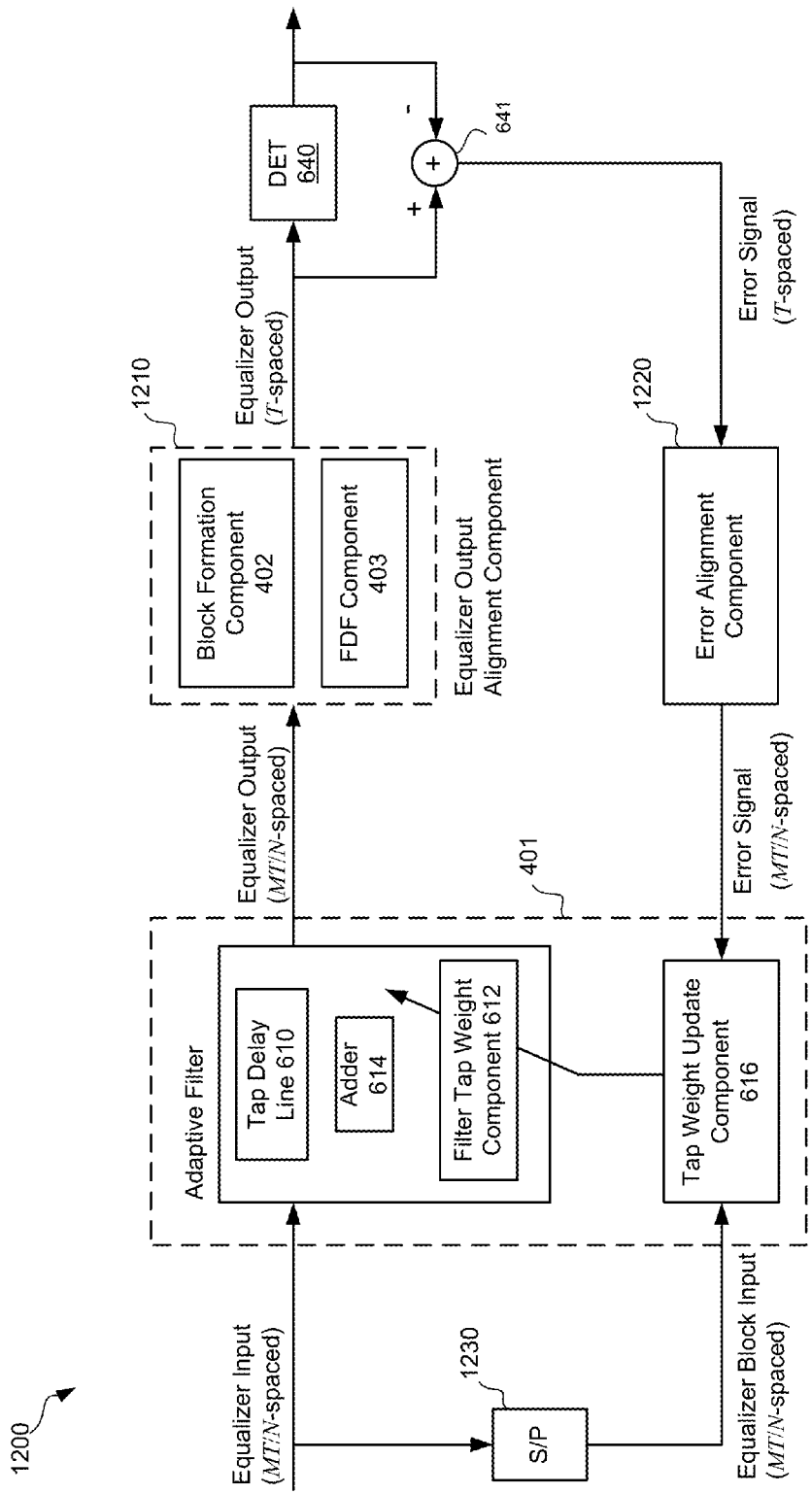
FIG. 12 depicts a more detailed implementation of the FDF-based AFSE system of FIG. 4 in accordance with one specific embodiment.

FIG. 12 is a block diagram overview of another embodiment of an FDF based AFSE system 1200. The AFSE system 1200 is similar to those previously described with reference to FIG. 4 and FIG. 6; however, the AFSE system 1200 includes an update mechanism for the tap weights of AFSE 401. Recall from the earlier description of FIG. 6 that the input signal to the AFSE 401 may have a non-integer, sub-symbol sample spacing of MT/N, wherein the adaptive filter of the AFSE 401 may comprise an L samples tap delay line 610, a filter tap weight component 612 and an adder 614 as illustrated in FIG. 12. Note that the variable L may represent the number of coefficients within the adaptive filter of the AFSE 401. The tap weight update component 616 of the AFSE 401 may utilize an error feedback loop for updating the filter tap weight component 612. The block formation component 402 and the FDF component 403 of FIG. 6 may be lumped into a single component that can be termed as equalizer output alignment component 1210 as shown in FIG. 12. The block formation component 402 and the FDF component 403 within the equalizer output alignment component 1210 may be configured to introduce a fractional delay in the channel equalized, MT/N-spaced, output signal from the AFSE 401. The equalizer output alignment component may output a T-spaced soft symbol that may be time-aligned with the transmitted symbol. The T-spaced output from the equalizer output alignment component 1210 may be fed to a symbol demodulator or symbol detector 640 that may provide a T-spaced error signal with the help of a comparator 641 as illustrated in FIG. 12.

Similar to the equalizer output alignment component 1210, the error alignment component 1220 may be configured to introduce a fractional delay in the T-spaced error signal from the comparator 641 to form an MT/N-spaced error signal so that it is time-aligned with the equalizer input signal. In FIG. 12, the S/P converter 1230 may convert the serial signal at the input of the equalizer into blocks of L samples. Subsequently, the tap weight update component 616 of the AFSE 401 may utilize an error signal from the error alignment component 1220 that is time-aligned with a block of the equalizer input signal to update a set of tap weights 612 of the AFSE 401 as shown in FIG. 12.

Figure 13:
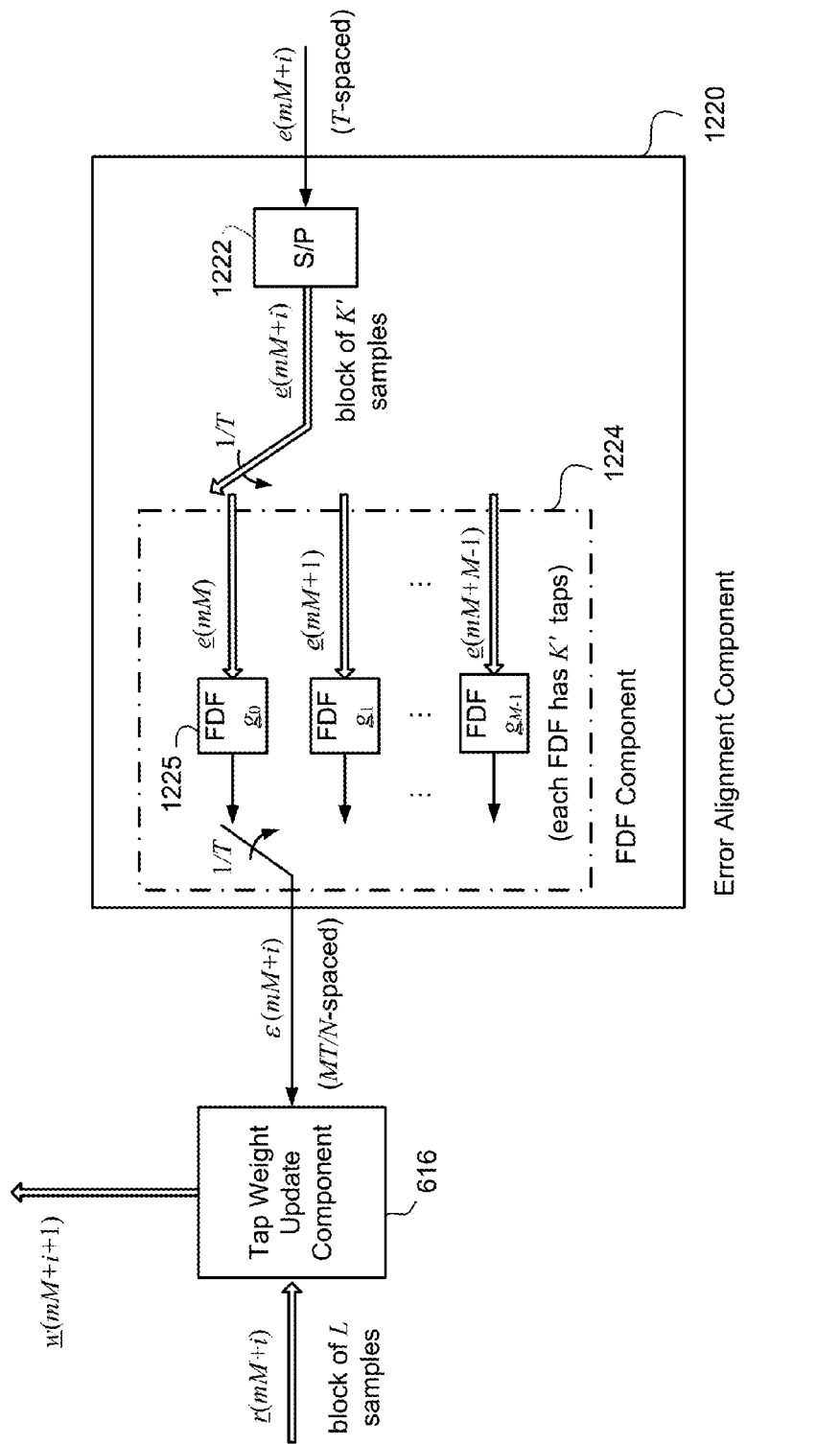
FIG. 13 depicts implementations of the tap weight update component and of the error alignment component shown in FIG. 12.

FIG. 13 depicts an implementation of the tap weight update component 616 along with details of the error alignment component 1220 as illustrated in FIG. 12. The error alignment component 1220 in FIG. 13 may comprise a S/P converter 1222 and an FDF component 1224, wherein the S/P converter 1222 and the FDF component 1224 may be configured to introduce a fractional delay in the incoming, T-spaced, error signal e(mM+i). Recall that e(mM+i) may represent the error signal corresponding to the (mM+i)$^{th}$ output symbol. The S/P converter 1222 may convert the incoming serial error signal e(mM+i) into a block error $\underline{e}$(mM+i) where each block may have K' samples. The variable K' may represent the number of coefficients within the fractional delay filter of the FDF component 1224. As illustrated in FIG. 13, the FDF component 1224 may comprise a plurality of FDFs 1225 in each of the M branches. The FDF in the i$^{th}$ branch may be referred to as g and may be configured to introduce a fractional delay $\delta_i$ in the incoming block error signal $\underline{e}$(mM+i). The output of the error alignment component 1220 may be an MT/N-spaced error signal ϵ (mM+i) that may be time aligned with the equalizer input signal.

In FIG. 13, the tap weight update component 616 may utilize an MT/N-spaced block input signal $\underline{r}$(n) from the S/P converter 1230 in FIG. 12 and an MT/N-spaced error signal ϵ(mM+i) from the error alignment component 1220 to produce an updated tap weight vector $\underline{w}$(mM+i+1) for the (mM+i+1)$^{th}$ output symbol. The equalizer tap weights vector $\underline{w}$(mM+i) may be updated based on any weight adaptation algorithm within the tap weight update component 616. For example, in case of the least mean square (LMS) tap weight update algorithm, the tap weight update component 616 for the next iteration to process the m$^{th}$ block from the (i+1)$^{th}$ branch is described in equation 5.

$$\underline{w}(mM+i+1)=\underline{w}(mM+i)+\mu\epsilon^*(mM+i)\underline{r}(mM+i) \quad (5)$$

In equation 5, the variable ϵ(mM+i) may represent an error signal that is time aligned with the equalizer input block $\underline{r}$(mM+i), the superscript * may represent a scalar conjugate operation, and μ may represent the step size of the LMS algorithm. Since the error ϵ(mM+i) from the i$^{th}$ branch of the FDF component 1224 may be used to compute the tap weights $\underline{w}$(mM+i+1) for the (i+1)$^{th}$ output symbol, a single adaptive filter may be used to process each of the M output symbols where (mM+i)$^{th}$ output symbol corresponds to an error signal ϵ(mM+i). The equalizer tap weights within the AFSE 401 may also be updated at a rate 1/T using any appropriate method of tap weight update known by persons skilled in the art, such as LMS or a recursive least squares (RLS) method.

FIG. 14 is a schematic diagram of yet another embodiment of an FDF based AFSE system 1400. Different from the FDF based AFSE system 1200 in FIG. 12, the FDF based AFSE system 1400 illustrated in FIG. 14 may use a T-spaced error signal to update the tap weights of the AFSE 401. Similar to the description of FIG. 12, the input signal to the AFSE 401 in FIG. 14 may have a sample spacing of MT/N and the adaptive filter of the AFSE 401 may comprise an L samples tap delay line 610, a filter tap weight component 612 and an adder 614. Again, the variable L may represent the number of coefficients within the adaptive filter of the AFSE 401. The tap weight update component 616 of the AFSE 401 may utilize an error feedback loop with T-spaced error signal for updating the filter tap weight component 612. The block formation component 402 and the FDF component 403 within the equalizer output alignment component 1210 may be configured to introduce a fractional delay in the channel equalized, MT/N-spaced, output signal from the AFSE 401. The equalizer output alignment component may output a T-spaced soft symbol that may be time aligned with the transmitted symbol. The T-spaced output from the equalizer output alignment component 1210 may be fed to a symbol demodulator or detector 640 that may provide a T-spaced error signal through comparator 641 as illustrated in FIG. 14.

In FIG. 14, the equalizer input alignment component 1410 may be configured to introduce a fractional delay in the equalizer input signal to form an MT/N-spaced equalizer block input signal that may be time aligned with the T-spaced error signal from the comparator 641. Subsequently, the tap weight update component 616 of the AFSE 401 may utilize a block input signal from the equalizer input alignment component 1410, which may be time aligned with a T-spaced error signal, to update a set of tap weights 612 of the AFSE 401 as shown in FIG. 14.

Figure 15:
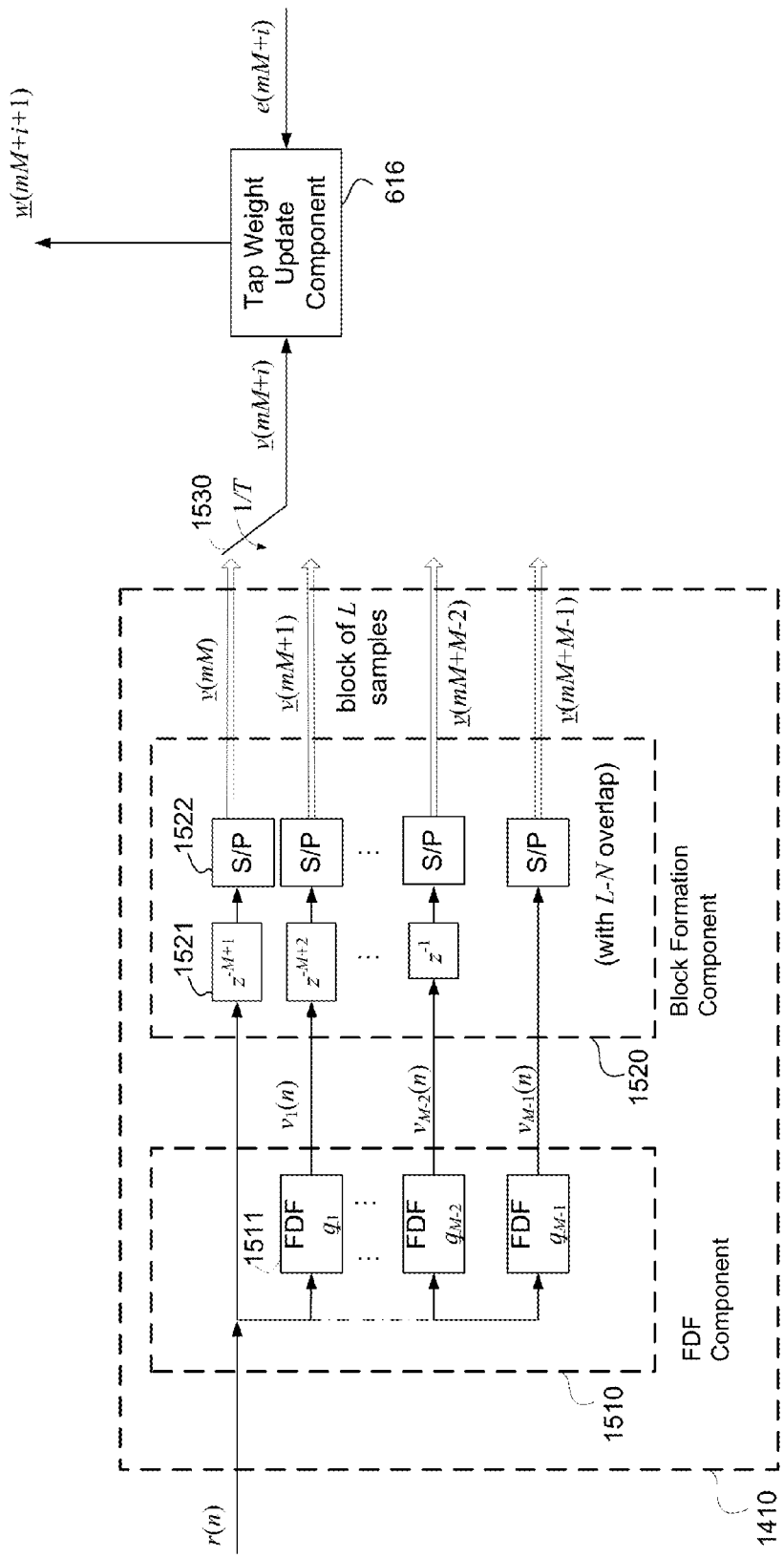
FIG. 15 depicts an implementation of the tap weight update component shown in FIG. 14.

FIG. 15 depicts an embodiment of the equalizer input alignment component 1410 along with the tap weight update component 616. The equalizer input alignment component 1410 may comprise an FDF component 1510 and a block formation component 1520. As illustrated in FIG. 15, the FDF component 1510 may include a plurality of FDFs 1511. The FDF component 1510 may replicate the received input samples, r(n), which are received at a rate N/(MT), into M number of branches. The variable n refers to the sample of data received as an input for the FDF based AFSE system 1400. The variable i may be used to refer to a specific branch of the M branches, and may have a range from zero to M−1. For example, the first branch is referenced as i=0 branch, the second branch is referenced as i=1 branch, and so forth. Except for the first branch (i=0), the other M−1 branches may comprise an FDF $q_j$ 1511 that introduces a fractional delay in the incoming signal. The $n^{th}$ sample of the serial output data from the $i^{th}$ branch of the FDF component 1510 may be referenced as $v_i(n)$ for i=1 to M−1.

The block formation component 1520 within the equalizer input alignment component 1410 may process each of the M output streams from the FDF component 1510 to form M streams of the equalizer input block data that may be time aligned with a T-spaced error signal. FIG. 15 illustrates the M streams of equalizer input block data as $\underline{v}$(mM+i) (e.g. $\underline{v}$(mM) through $\underline{v}$(mM+M−1)). Each of the M streams of equalizer input block data may have a length of L samples where the variable L represents the number of coefficients within the adaptive filter of the AFSE 401 shown in FIG. 14. Each branch in the block formation component 1520 may comprise a delay element 1521 with branch dependent integer delay, followed by a S/P converter 1522. As shown in FIG. 15, the delay element 1521 is described in terms of z-transform delay where $z^{-1}$ refers to a unit sample delay. Other types of integer sample delays known by persons of ordinary skill in the art may be used for the delay element 1521. The delay element 1521 in the first branch may introduce a delay of M−1 samples when the sample rate is N/(MT). The delay element in the $i^{th}$ branch may introduce a delay of M−1−i. The delay in each branch may be used to maintain the position of the desired sample at a fixed point within a block. As shown in FIG. 15, the last branch (i=M−1) may not comprise a delay element 1521.

The M output streams from the FDF component 1510 reach the S/P converters 1522 after traversing through the delay elements 1511. The S/P converter 1522 in each branch may form blocks of L samples. Again, the variable L represents the number of coefficients within the adaptive filter of the AFSE 401. The S/P converter 1522 may form blocks with an overlap of L-N samples from the previous block so that each block has N new samples and the $(mM+i)^{th}$ block of the equalizer input data is time aligned with a T-spaced error signal e(mM+i).

The output of the block formation component 1520 may be connected to the tap weight update component 616 through a commutator 1530. The commutator 1530 may be any type of electrical switch (e.g. transistors) configured to sequentially tap the block data from one of the M streams of equalizer input block data $\underline{v}$(mM+i) (e.g. $\underline{v}$(mM) through $\underline{v}$(mM+M−1)) of the block formation component 1520 as an input block data for the tap weight update component 616. The commutator 1530 may cycle through the M streams of output block data $\underline{v}$(mM+i) at symbol rate 1/T that is about equivalent to the block rate of 1/(MT) from individual streams. FIG. 15 references the $(mM+i)^{th}$ block of equalizer input data from the $i^{th}$ branch of the block formation component 1520 as v(mM+i). The cycled through M streams of the equalizer input block data may be processed by the tap weight update component 616 that may provide updated tap weights.

In FIG. 15, the tap weight update component 616 may utilize an MT/N-spaced equalizer block input signal $\underline{v}$(mM+i) from the equalizer input alignment component 1410 and a T-spaced error signal e(mM+i) corresponding to the (mM+i)th output symbol to produce an updated tap weight vector $\underline{w}$(mM+i+1) for the $(mM+i+1)^{th}$ output symbol. The equalizer tap weights vector $\underline{w}$(mM+i) may be updated based on any weight adaptation algorithm within the tap weight update component 616. For example, in case of the least mean square (LMS) tap weight update algorithm, the tap weight update component 616 for the next iteration to process the $m^{th}$ block from the $(i+1)^{th}$ branch is described in equation 6:

$$\underline{w}(mM+i+1)=\underline{w}(mM+i)+\mu e^*(mM+i)\underline{v}(mM+1) \quad (6)$$

In equation 6, the variable $\underline{v}$(mM+i) may represent an equalizer input block signal that is time aligned with the error signal e(mM+i), the superscript * may represent a scalar conjugate operation, and µ may represent the step size of the LMS algorithm. Since the equalizer block input $\underline{v}$(mM+i) from the $i^{th}$ branch of the equalizer input alignment component 1410 may be used to compute the tap weights $\underline{w}$(mM+i+1) for the $(i+1)^{th}$ output symbol, a single adaptive filter may be used to process each of the M output symbols where $(mM+i)^{th}$ output symbol corresponds to an equalizer input block signal $\underline{v}$(mM+i). The equalizer tap weights within the AFSE 401 may also be updated at a rate 1/T using any other appropriate method of tap weight update known by persons skilled in the art. The embodiments of the tap weight update component 616 illustrated in FIG. 14 and FIG. 15 may exhibit a reduced loop delay for the tap weight update process as compared to the embodiments of FIG. 12 and FIG. 13.

Figure 16:
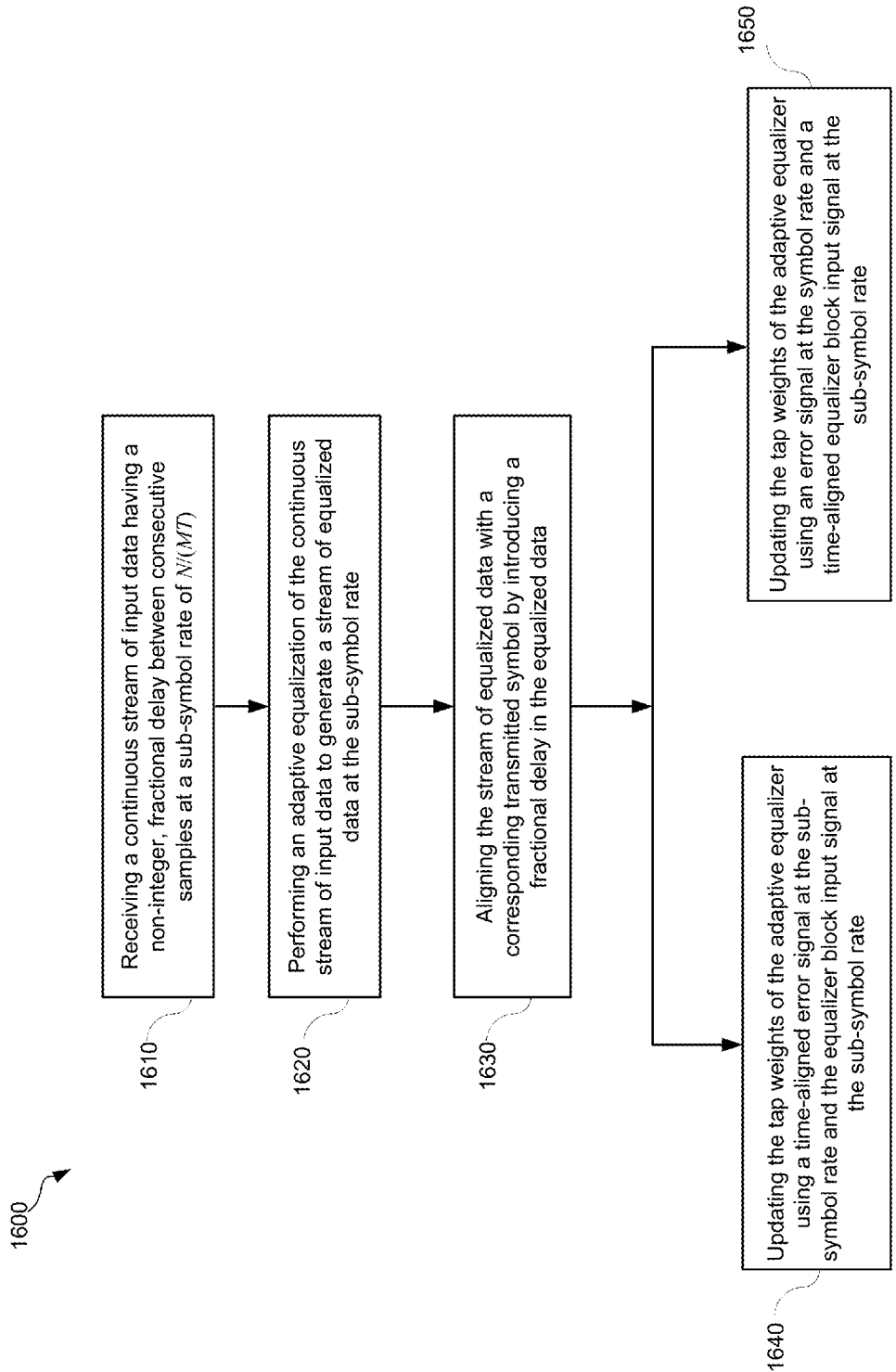
FIG. 16 is a flowchart outlining a method of fractionally spaced adaptive equalization using non-integer, sub-symbol sampling.

FIG. 16 is a flowchart outlining a method 1600 of performing adaptive fractionally spaced equalization with non-integer, sub-symbol sampling. The method 1600 may start at step 1610 that entails receiving a continuous stream of input data having a non-integer fractional delay between consecutive samples at a sub-symbol rate of N/(MT). The method 1600 may then move to step 1620 that entails performing adaptive equalization of the continuous stream of input data to generate a stream of equalized data at the sub-symbol. The method 1600 may then continue to step 1630 that includes aligning the stream of equalized data with a corresponding transmitted symbol by introducing a fractional delay in the equalized data. The method 1600 may then continue to step 1640 or step 1650. The step 1640 involves updating the tap weights of the adaptive equalizer using a time-aligned error signal at the sub-symbol rate and the equalizer block input signal at the sub-symbol rate. The step 1650 involves updating the tap weights of the adaptive equalizer using an error signal at the symbol rate and a time-aligned equalizer block input signal at the sub-symbol rate.

Figure 17:
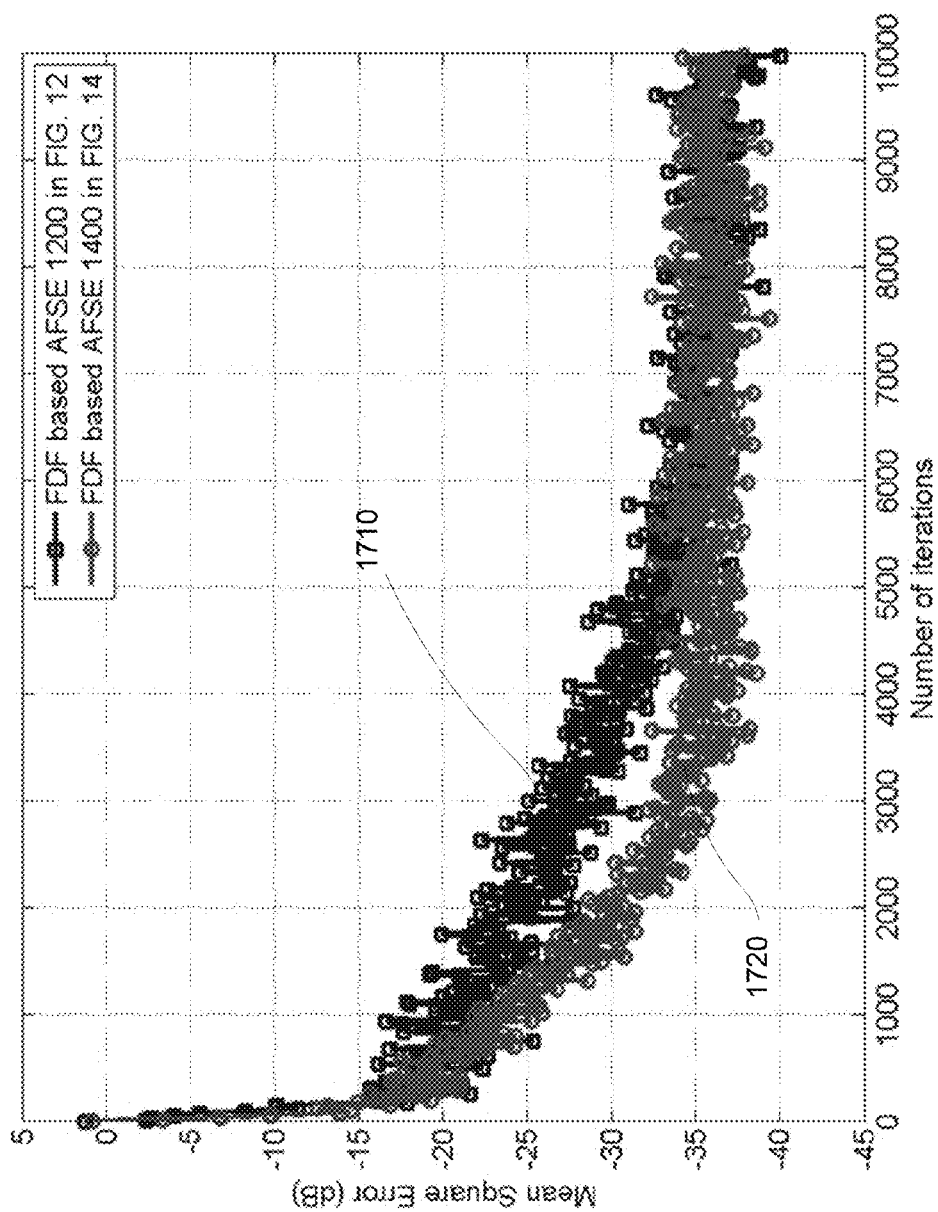
FIG. 17 depicts the performance of the apparatus sampling the received signal with non-integer sub-symbol sampling at a rate 4/(3T) and implementing an FDF based AFSE according to FIG. 12 and an FDF based AFSE according to FIG. 14.

FIG. 17 depicts a graph showing the performance of two exemplary embodiments of an FDF based AFSE system 400 operating at a receiver of a communication system employing quadrature phase shift keying (QPSK) modulation and a raised cosine pulse shaping filter with about 20% excess bandwidth. Specifically, the receiving node may sample the received signal with non-integer, sub-symbol sampling at rate 4/(37) such that M=3 and N=4. The FDFs 630 within the FDF component 403 may be equiripple FIR filters of length K=8 and the length of the adaptive equalizer (AFSE 401) is L=9 in this example implementation. The graph 1710 of FIG. 17 presents mean square error (in dB) as a function of the number of iterations for the embodiments of the FDF based AFSE system 1200 illustrated in FIG. 12. Similarly, the graph 1720 of FIG. 17 presents mean square error (in dB) as a function of the number of iterations for the embodiments of the FDF based AFSE system 1400 illustrated in FIG. 14. As described earlier, the FDF based AFSE system 1200 employs an error alignment component 1220 that increases tap weight update loop delay and results in slower convergence as shown in FIG. 17.

In the embodiments described above, equalization is decoupled from the fractional delay for time alignment. The apparatus or system 400 has low complexity by virtue of having only a single fractionally spaced adaptive equalizer 401 that works in conjunction with fractional delay FIR filters having a bank of fixed coefficients. The use of a single adaptive equalizer, e.g. a single AFSE 401, keeps the length of training symbols unchanged which represents an improvement over the prior art which requires more training symbols to train multiple adaptive filters. As an alternative solution to the apparatus 10 disclosed in U.S. Pat. No. 9,112,742, the apparatus or system 400 disclosed herein receives input to the AFSE 401 as a continuous stream of data, which permits the AFSE 401 to implement linear filtering using short convolutions with reduced complexity.

One or more embodiments described above may include one or more of the following advantages. Non-integer sub-symbol sampling reduces the ADC sampling rate and hence reduces the power consumption of a receiver incorporating the apparatus or system 400. A lower clock speed for subsequent digital signal processing (DSP) modules increases the power efficiency of the DSP chip. Power consumption is lessened by using a single AFSE 401 to process the data at a lower rate than conventional FSEs, which process data at a rate that is at least twice the symbol rate. Using a single AFSE 401 reduces circuit complexity and hence reduces fabrication costs. With a low complexity architecture, the form factor of the AFSE 401 can be made smaller.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

What is claimed is:

1. An apparatus for performing fractionally spaced adaptive equalization based on non-integer sub-symbol sampling, the apparatus comprising:
   an adaptive equalizer configured to receive a continuous stream of input data having a non-integer, fractional delay between consecutive samples at a non-integer, sub-symbol rate and to output a stream of equalized data based on tap weights of the adaptive equalizer, wherein the adaptive equalizer comprises a plurality of taps and a tap weight update component for updating the tap weights using an error signal; and
   an equalizer output alignment component disposed downstream of the adaptive equalizer and comprising a fractional delay filter (FDF) for aligning the stream of equalized data with a corresponding transmitted symbol,
   wherein the taps are spaced at an interval corresponding to the non-integer, sub-symbol rate, and
   wherein the tap weights are updated independently of the fractional delay between consecutive samples of the input data.

2. The apparatus of claim 1, wherein the equalizer output alignment component further comprises a serial-to-parallel (S/P) converter, wherein the S/P converter is configured to receive the stream of equalized data from the adaptive equalizer and to form a stream of block equalized data comprising a plurality of overlapping blocks.

3. The apparatus of claim 2, wherein the FDF is configured to receive the stream of block equalized data and to introduce a periodic fractional delay in the stream of block equalized data to time-align each block of the block equalized data with the corresponding transmitted symbol.

4. The apparatus of claim 3, wherein the FDF processes each block of the block equalized data at a symbol rate and introduces the fractional delay by computing an inner product of the block equalized data with FDF coefficients.

5. The apparatus of claim 4, further comprising a symbol detector downstream of the equalizer output alignment component, wherein the symbol detector is configured to detect transmitted symbols using the time-aligned equalized data blocks from the equalizer output alignment component and to provide an error signal at the symbol rate.

6. The apparatus of claim 5, further comprising an error alignment component configured to receive the error signal at the symbol rate from the symbol detector, wherein the error alignment component comprises an FDF to introduce a periodic fractional delay in the error signal to align the error signal with the continuous stream of input data at the sub-symbol rate.

7. The apparatus of claim 6, wherein the tap weight update component updates one or more tap weights of the adaptive equalizer, and wherein the adaptive equalizer tap weights are updated at the symbol rate using the error signal from the error alignment component and the continuous stream of input data.

8. The apparatus of claim 5, further comprising an equalizer input alignment component configured to receive the continuous stream of input data at the sub-symbol rate, and wherein the equalizer input alignment component comprises a plurality of FDFs to introduce a plurality of fractional delays in the input data in order to align the input data with the error signal at the symbol rate.

9. The apparatus of claim 8, wherein the tap weight update component updates one or more tap weights of the adaptive equalizer, and wherein the adaptive equalizer tap weights are updated at the symbol rate using the error signal from the symbol detector and the input data from the equalizer input alignment component.

10. The apparatus of claim 1, wherein the adaptive equalizer, receiving the continuous stream of input data, is configured to perform short convolutions between the input data and the tap weights to reduce complexity.

11. A method of performing fractionally spaced adaptive equalization with non-integer, sub-symbol sampling, the method comprising:
   receiving a continuous stream of input data having a non-integer, fractional delay between consecutive samples at a non-integer, sub-symbol rate;
   performing an adaptive equalization by an adaptive equalizer of the continuous stream of input data to generate a stream of equalized data at the sub-symbol rate; and
   aligning the stream of equalized data with a corresponding transmitted symbol by introducing a fractional delay in the equalized data,
   wherein the adaptive equalization of the input data is decoupled from the fractional delay alignment of the input data, and
   wherein the adaptive equalization is based on taps that are spaced at an interval corresponding to the non-integer, sub-symbol rate.

12. The method of claim 11, further comprising performing a serial-to-parallel (S/P) conversion of the stream of equalized data from the adaptive equalizer to form a stream of block equalized data comprising a plurality of overlapping blocks.

13. The method of claim 12, further comprising introducing a fractional delay in the stream of block equalized data to time-align each block of the block equalized data with the corresponding transmitted symbol.

14. The method of claim 13, further comprising detecting transmitted symbols using the time aligned equalized data blocks and providing an error signal at a symbol rate.

15. The method of claim 14, further comprising introducing a fractional delay in the error signal at the symbol rate to provide an error signal at the sub-symbol rate, wherein the error signal at the sub-symbol rate is time-aligned with the continuous stream of input data at the sub-symbol rate.

16. The method of claim 15, further comprising updating, at the symbol rate, a single set of adaptive equalizer tap weights using the time-aligned error signal at the sub-symbol rate and an equalizer block input signal formed by a S/P conversion of the continuous stream of input data.

17. The method of claim 14, further comprising introducing a fractional delay in the continuous stream of input data to provide a block input data at the sub-symbol rate, wherein the block input data is time-aligned with the error signal at the symbol rate.

18. The method of claim 17, further comprising updating, at the symbol rate, a single set of adaptive equalizer tap weights using the error signal at the symbol rate and the time-aligned block input data at the sub-symbol rate.

19. The method of claim 11, wherein the adaptive equalization of the continuous stream of input data comprises short convolutions between the input data and tap weights to reduce complexity.

* * * * *